United States Patent
Van Dalfsen

[19]

[11] Patent Number: 5,959,608
[45] Date of Patent: Sep. 28, 1999

[54] SPLINE WAVEFORM GENERATION

[75] Inventor: Age J. Van Dalfsen, Eindhoven, Netherlands

[73] Assignee: U.S. Philips Corporation, New York, N.Y.

[21] Appl. No.: 08/843,979

[22] Filed: Apr. 18, 1997

[30] Foreign Application Priority Data

Apr. 26, 1996 [EP] European Pat. Off. .............. 96201139

[51] Int. Cl.$^6$ ..................................... G09G 5/36
[52] U.S. Cl. ............................. 345/134; 345/133
[58] Field of Search ............................. 345/23, 24, 116, 345/125, 131, 133, 134

[56] References Cited

U.S. PATENT DOCUMENTS

| | | | |
|---|---|---|---|
| 5,111,191 | 5/1992 | Povenmire | 345/134 |
| 5,379,239 | 1/1995 | Nakatani | 345/134 |
| 5,739,807 | 4/1998 | Thong | 395/134 |
| 5,784,284 | 7/1998 | Tareki | 345/133 |

*Primary Examiner*—Vijay Shankar
*Attorney, Agent, or Firm*—Edward W. Goodman

[57] ABSTRACT

A one-dimensional p-th order spline waveform (Cw) extending along the width or height of a picture device display screen is generated as a chain of sections of p-th order sub-functions (Sfi) of a position address (P). If n predetermined values (ai) are available, n-p p-th order sub-functions (Sfi) can be generated each in one of n-p sections (Si). $q \geq (p+1)$ values (asi) are selected from an array containing the n predetermined values (ai) and then the q selected values (asi) are converted into sub-function coefficients (bi) determining each of the p-th order sub-functions (Sfi). Each of the p-th order sub-functions (Sfi) can be written as a linear combination of polynomials of the position address (P) multiplied with associated sub-function coefficients (bi). Further, each of the p-th order sub-functions (Sfi) can be imagined to be obtained by an addition, in a section (Si), of portions (pi) of basic functions (Fbi) each multiplied by an associated one of the predetermined values (ai). The basic functions (Fbi) are p-th order spline functions. Each of the portions (pi) of the basic functions (Fbi) is written as a linear combination of portion coefficients (cij) corresponding to polynomials of the position address (P). The polynomials range from zero order up to the p-th order. The portion coefficients (cij) determine the shape of the basic p-th order spline functions (Fbi). Each of the sub-function coefficients (bi) can be calculated from the selected values (asi) by multiplying a matrix including the portion coefficients (cij) with the selected values (asi). The matrix must be a spline matrix to obtain sub-functions (Sfi) together composing the spline waveform (Cw). The process of converting the selected values into one of the sub-function coefficients is the same in every section (Si) since a fixed matrix of portion coefficients (cij) or multiplication factors is used.

11 Claims, 7 Drawing Sheets

SPLINE WAVEFORM GENERATION

BACKGROUND OF THE INVENTION

1. Field of the Invention

The invention relates to a method and a system for generating a one-dimensional spline waveform, the one-dimensional spline waveform being a function of a position on a screen of a display device in one direction, the method comprising the steps of: generating, from a position information indicating the position on the screen, a position address, the position address indicating a number of a section and a relative position indicating a position within the section for virtually partitioning the screen in sections in the one direction; calculating, in each section, from the relative position and a set of sub-function coefficients, a sub-function being a polynomial for obtaining the one-dimensional spline waveform being a chain of consecutive sub-functions in corresponding consecutive section; and converting, in each section, predetermined values into the sub-function coefficients.

The invention also relates to a method for generating a two-dimensional spline waveform, the two-dimensional spline waveform being dependent on a position in a first and a second direction on a screen of a display device, the display device being scanned in a raster of lines, the first and the second direction being substantially perpendicular.

Such a waveform may be used for correcting deflection errors of a display tube, such as convergence errors or east-west distortions. Such a waveform may also be used as a dynamic focusing waveform, or as a waveform influencing the brightness of a displayed picture to compensate for brightness non-uniformity on a display device.

2. Description of the Related Art

It is known that a quadratic spline waveform, which extends along the whole width or hight of a picture tube screen, and which is a function of a position address, can be generated as a chain of sections of second order sub-functions of the position address. Input coefficients (the predetermined values) are stored in a memory and are referred to as stored values. If n stored values are available, n−2 second order sub-functions can be generated each in one of n−2 sections. The first second order sub-function is fully determined by 3 of the stored values, and a succeeding second order sub-function in a succeeding section is determined by only one stored value, as 2 conditions are already fixed by the demand that the resulting quadratic spline waveform must have a value, and a first derivative which are continuous in every point, so also at the boundary of the two consecutive sections. This follows from the definition of a p-th order spline function, viz. a function which is, and whose first thru (p−1)-th derivatives are continuous in every point. The quadratic spline waveform is generated as follows:

in a first section, a first parabola function is calculated at desired positions determined by the position address, and by using three of the stored values as parabola coefficients ($f_1(x)=a0+a1.x+a2.x^2$). The stored values are adjustable to obtain a shape of the parabola sections fitting the needed correction on the picture tube screen, in every further section, a further parabola is calculated at wished positions determined by the position address using only one stored value not yet used, and by calculating the parabola coefficients out of that one stored value and the two equations determined by the fact that at the border of two succeeding sections, the value and the first derivative of the parabola functions in these sections have to be equal. Hence, two of the parabola coefficients of a succeeding section will depend on coefficients of preceding sections. The calculation of the parabola coefficients from the stored values becomes more and more complex every further section.

It is a disadvantage of the known way of generating a quadratic spline waveform that in each section, a different program of a computer or different hardware circuits are needed for converting the stored values into parabola coefficients. The most complex calculation in the last section determines the complexity of the program or the hardware circuits. Further, this complex calculation may need too much time to perform the calculations in real time without storing the sub-function coefficients or intermediate results. A further drawback is that the one extra coefficient used in every section determines the second derivative of the sub-function in this section. The generated quadratic spline waveform will deviate from an intended waveform if this coefficient has been determined slightly wrong. The deviation will influence the generated quadratic spline waveform in all further sections.

SUMMARY OF THE INVENTION

It is an object of the invention to calculate a majority of the sub-function coefficients from the predetermined values in a same way in each section.

It is a further object of the invention to convert the predetermined values into the sub-function coefficients without storing the sub-function coefficients for every section.

To this end a first aspect of the invention provides a method for generating a one-dimensional spline waveform, the one-dimensional spline waveform being a function of a position on a display screen of a display device in one direction, the method comprising the steps of generating, from a position information indicating the position on the display screen, a position address, the position address being partitioned in a section number indicating a number of a section, and a relative position indicating a position within the section, for virtually partitioning the display screen in sections in the one direction; calculating, in each section, from the relative position and a set of p+1 sub-function coefficients, a sub-function being a polynomial of degree p>1 for obtaining the one-dimensional spline waveform being a chain of n–p consecutive sub-functions in n–p corresponding consecutive sections, an analog representation of the one-dimensional spline waveform being continuous and at least p−1 times continuous differentiable; selecting, in response to the section number, from an array of n consecutive predetermined values a selected subset of q>p+1 consecutive selected values, the selected subset for the section being a(I+r),a(I+r+1), . . . , a(I+r+q−1) with r being selected from a range p+1−q≦r≦0, whereby a(I)=0 for i<1 and i>n; and multiplying in each section, the selected subset with a fixed (p+1)*q spline matrix of multiplication factors to produce the set of p+1 subfunction coefficients.

A second aspect of the invention provides a method for generating a two-dimensional spline waveform, the two-dimensional spline waveform being dependent on a position in a first and a second direction on a screen of a display device, the display device being scanned in a raster of lines, the first and the second directions being substantially perpendicular, the method comprising the steps of generating m one-dimensional spline waveforms from m sets of predetermined values, the one-dimensional spline waveforms being generated according to the method described above, wherein the position address is a position address related to the position on the screen in the first direction, each of the one-dimensional waveforms representing output values being the values of the one-dimensional waveforms at the positions of the lines in the raster; and generating, from the output values and a position address related to the position on the screen in the second direction, the two-dimensional spline waveform.

A third aspect of the invention provides a system for generating a one-dimensional spline waveform, the one-dimensional spline waveform being a function of a position on a display screen of a display device in one direction, the system comprising means for generating, from a position information indicating the position on the display screen, a position address, the position address being partitioned in a section number indicating a number of a section and a relative position indicating a position within the section, for virtually partitioning the display screen in sections in the one direction; calculating means for calculating, in each section, from the relative position and a set of p+1 sub-function coefficients, a sub-function being a polynomial of degree p>1 for obtaining the one-dimensional spline waveform being a chain of n−p consecutive sub-functions in n−p corresponding consecutive sections, an analog representation of the one-dimensional spline waveform being continuous and at least p−1 times continuous differentiable, selecting, in response to the section number, from an array of n consecutive predetermined values a selected subset of $q \geq p+1$ consecutive selected values, the selected subset for the section being a(I+r),a(I+r+1), . . . ,a(I+r+q−1) with r being selected from a range $p+1-q \leq r \leq 0$, whereby a(I)=0 for i<1 and i>n, and multiplying, in each section, the selected subset with a fixed (p+1)*q spline matrix of multiplication factors to produce the set of p+1 subfunction coefficients.

A fourth aspect of the invention provides a display apparatus comprising a system for generating a one-dimensional spline waveform, being represented by discrete values, the one-dimensional digital waveform being a function of a position on the display screen in one direction, the system for generating the one-dimensional digital waveform comprising means for generating from a position information indicating the position on the display screen a position address, the position address being partitioned in a section number indicating a number of a section and a relative position indicating a position within the section for virtually partitioning the display screen in sections in the one direction; calculating means for calculating, in each section, from the relative position and a set of p+1 sub-function coefficients a sub-function being a polynomial of degree p>1 for obtaining the one-dimensional digital waveform being a chain of n−p consecutive sub-functions in n−p corresponding consecutive sections, selecting, in response to the section number, from an array of n consecutive predetermined values, a selected subset of $q \geq p+1$ consecutive selected values, the selected subset for the section being a(I+r),a(I+r+1), . . . , a(I+r+q−1) with r being selected from a range $p+1-q \leq r \leq 0$, whereby a(I)=0 for i<1 and i>n, and multiplying in each section, the selected subset with a fixed (p+1)*q spline matrix of multiplication factors to produce the set of p+1 subfunction coefficients; means for converting the one-dimensional digital waveform into an analog one-dimensional spline waveform, the analog one-dimensional spline waveform being continuous and at least p−1 times continuous differentiable; and means, receiving the analog one-dimensional spline waveform, for influencing the position on the display screen.

A fifth aspect of the invention provides another method for generating a one-dimensional waveform, the one-dimensional spline waveform being a function of a position on a display screen of a display device in one direction, the method comprising the steps of generating, from a position information indicating the position in the one direction, a position address; and generating, at positions indicated by the position address, a correction waveform from n predetermined input values, the correction waveform being a p-th order spline function composed of n−p consecutive sub-functions in n−p respectively corresponding consecutive sections, wherein p is larger than 1, characterized in that the correction waveform generating step comprises the steps of generating n basic functions of the position address, the basic functions all having a same shape and being shifted over one section with respect to each other, and each being a ki-th order spline function, the basic functions being composed as a chain of portions each extending over one section; multiplying each of the basic functions with an associated one of the stored values; calculating each of the sub-functions by adding, in a same section, the portions of the basic functions in this section multiplied with the associated stored values.

The invention generates a p-th order one-dimensional spline waveform (further referred to as p-th order spline waveform or spline waveform) of the position address. The position address may be a horizontal address representing a horizontal position on the screen of the display device, or a vertical address representing a vertical position on the screen of the display device. The term one-dimensional indicates that the spline waveform depends on only one variable which is either the horizontal or vertical address. The p-th order spline waveform may extend along the whole width or height of the screen and is composed of a chain of sections of p-th order sub-functions of the position address. The position address is partitioned in a section number indicating the number of a section and a relative position indicating the position within a section. If n stored values or predetermined values are available, n−p p-th order sub-functions can be generated, each in one of n−p sections. The first p-th order sub-function is fully determined by p+1 of the predetermined values. A succeeding p-th order sub-function in a succeeding section is determined by only one predetermined value not yet used, as p conditions are already fixed by the demand that the resulting p-th order spline correction waveform must have a value, and a first up to and including a (p−1)-th derivative which are continuous in every point, so also at the boundary of two consecutive sections. The invention uses the fact that any p-th order sub-function is fully determined by at least p+1 sub-function coefficients. The invention relates to first selecting q>(p+1) selected values from an array containing the n predetermined values and then converting the q selected values into sub-function coefficients determining each of the p-th order sub-functions. The conversion is performed such that a p-th order spline waveform is generated. In a first section, a first set of q consecutive selected values, which have indices 1 to q, may be selected from the array of n consecutive predetermined values. In a succeeding second section, a second set of q consecutive predetermined values, which have indices 2 to q+1, are selected from the n consecutive predetermined values. So, the index of a set of the q selected values is incremented by one in a succeeding section.

It is possible that the selection of the set of q selected values from the n predetermined values starts with selecting a subset r<q of the n predetermined values which have indices 1 to r, while the q−r selected values which are selected outside the range of n predetermined values (which is the case for indices smaller than 1 or larger than n) get a value zero. These zero values precede the r selected values in the set of q selected values. In the next section r+1 selected values correspond to predetermined values which have indices 1 to r+1, and only q-r-1 selected values will be zero. A same selection outside the array of n predetermined values is possible at the end of the array. In this way it is possible to use an identical conversion of selected values into sub-function coefficients although not a same amount of predetermined values is used in every section.

In the following, the conversion from the selected values into the sub-function values is described.

The invention is based on the insight that it is possible to imagine the p-th order spline waveform extending over the n–p sections to be composed out of a linear addition of basic p-th order spline functions each multiplied by a weighting factor, whereby each weighting factor is one of the n stored values, The basic p-th order spline functions may extend over a few or all sections. A part of the basic p-th order spline function in one section is called a portion or a basic section function.

A p-th order sub-function, which is the p-th order spline waveform in one of the sections, is obtained by an addition of portions of the weighted basic p-th order spline functions in this section. Each of the portions of the basic p-th order spline functions is written as a linear combination of portion coefficients (or multiplication factors) corresponding to polynomials of the position address. The polynomials range from zero order up to the p-th order. The portion coefficients determine the shape of the basic p-th order spline functions, and are determined to obtain a same conversion of stored values into sub-function coefficients in every section for a majority or all of the sub-function coefficients (a few examples are given in the FIGS. 3 and 6).

The conversion from the stored values into the sub-function coefficients is obtained by calculating the sub-function coefficients out of the added portions of the basic p-th order spline functions, wherein each of the portions is multiplied with an associated one of the stored values. In other words, the addition, in one of the sections, of the portions of the basic p-th order spline functions each multiplied with an associated selected value provides Do the p-th order sub-function in this section. The p-th order sub-function may be written as having a zero order polynomial of the position address multiplied with a first sub-function coefficient, added to a first order polynomial multiplied with a second sub-function coefficient, and so on. As a last term, a p-th order polynomial of the position address multiplied with a (p+1)th sub-function coefficient is added. Each of the sub-function coefficients is thus a linear combination of the portion coefficients associated with the same polynomial of each of the added portions of the basic p-th order spline functions multiplied by the associated selected values, whereby the portions occurring in a same section are added. While in the above, reference is made to polynomials having a given order, also powers of the position address may be used. Hence, as the sub-function coefficients are determined by linear combinations of the portion coefficients (or multiplication factors) and the selected values, the sub-function coefficients are obtained by multiplying the selected values with a (p+1)*n spline matrix of multiplication factors. The term spline indicates that the multiplication factors are determined to obtain a spline waveform.

As stated earlier, the invention is based on the insight that it is possible to compose the p-th order spline waveform extending over the n–p sections out of a linear addition of basic p-th order spline functions each multiplied by one of the n predetermined values. The fact that the basic functions must be p-th order spline functions causes the succeeding portions of one of the basic functions to have shapes that depend on each other. Thus, portion coefficients of succeeding portions depend on each other. This dependence manifests itselfs in a specific relation between the multiplication factors of the spline matrix. Numerous possibilities exists to choose basic functions that are p-th order spline functions. Examples of basic spline functions are shown in FIGS. 3 and 6.

The spline matrix has to fulfill a further condition to obtain a same conversion in every section for a majority of sub-function coefficients. If the basic p-th order spline functions, as defined above, are copies of each other which each are shifted over one section with respect to each other, the portions which together, in a chain, compose one of the basic p-th order spline functions will repeat in every section as portions of different basic p-th order spline functions. Thus, in every section, the same portions of succeeding different basic p-th order spline functions are added, only the weighting factors or stored values differ. This means that the process of converting the stored values into sub-function coefficients is the same in every section: the sub-function coefficients are the same linear combination of different stored values multiplied by chosen portion coefficients. Such a same linear combination gives rise to a fixed matrix of multiplication factors or portion coefficients.

It is advantageous to use a same process in every section for converting the selected stored values into the sub-function coefficients of the p-th order sub-function of the position address to be able to use one algorithm in a suitably programmed computer. If the correction waveform generation is obtained by a circuit which comprises hardware circuits, it is advantageous to be able to use the same hardware in every section.

The sub-function coefficients may actually be calculated according to the invention. In this case, the calculation of a sub-function at positions in a section determined by the position address is performed by multiplying each of the sub-function coefficients with the associated polynomial of the position address and adding the results of the multiplications.

It is also possible to calculate the sub-functions directly from the basic p-th order spline functions which each are multiplied with an associated stored value. The waveform generation, according to the invention, needs only a few stored values, as the generated correction waveform has an order higher than one.

The waveform generated according to the invention may be used directly, for example, to influence the deflection of a picture tube to correct a deflection error which is dependent on a position on the screen in one direction, for example, for correcting an east-west error which only depends on the vertical position on the screen. Such a waveform is referred to as a one-dimensional waveform, as this waveform depends on only one variable (a horizontal or a vertical position address). Such a one-dimensional waveform may also be used to correct for a non-uniform brightness on a picture tube, for example, caused by a varying glass thickness of the picture tube screen. In this case, the one-dimensional waveform may be used to obtain a correction voltage influencing the contrast control. In the same way, a non uniformity of a brightness of a LCD display due to a non-uniform back-lighting can be corrected. Further, it would be possible to generate a one-dimensional waveform which drives a vertical deflection of a picture tube, or which is a correction waveform for obtaining a position dependent scan velocity modulation.

If a deflection error depends on a position on the screen in both directions (horizontal and vertical), as is often the case if a convergence error has to be corrected, in every line, a final correction waveform has to be generated which depends on the horizontal and vertical position on the screen. Such a waveform is referred to as a two-dimensional waveform which depends on two variables (the horizontal and vertical position address). It is known to generate such a two dimensional correction waveform according to the expression:

$$Wa(x,y)=a1.f1(x,y)+\ldots+an.fn(x,y)$$

wherein:

x is a horizontal position on the screen, y is a vertical position on the screen, ai are adjustable stored values, and fi(x,y) are waveform functions of x and y, for example: x, y, $x^2$, x.y, $x^2.y^2$.

Such a known correction waveform generator has to generate complex waveform functions, such as the cross-terms $x^i.y^i$, and is very difficult to adjust to obtain a desired quality of correction.

It is a further aspect of the invention that the two-dimensional correction waveform can be generated, in each line, from calculated coefficients which are derived from a function of the vertical position on the screen, this instead of using the above mentioned adjustable stored values. This function of the vertical position on the screen is the one-dimensional waveform generated according to the first aspect of the invention as described above. The final correction waveform becomes simple, as the waveform functions only need to depend on the horizontal position, because the calculated coefficients already depend on the vertical position. If a same amount of stored values is used, the quality of the correction, according to the invention, is improved, as the calculated coefficients are generated to be a very smooth (spline) function so that no sharp transitions occur.

An advantageous embodiment of the invention is characterized in that in every row of the spline matrix, at least one of the multiplication factors is not zero for obtaining sub-functions comprising all powers of the relative position from zero up to and including the p-th power. To obtain optimal freedom in selecting the one dimensional p-th order spline waveform, it should be possible to generate any wished p-th order sub-function in every section. This implies that the basic p-th order spline functions have to be chosen such that the portions added in each segment give rise to a zero order component up to and including the p-th order of the position address. Thus, each of the basic p-th order spline functions is composed out of portions which, if they would be added thereby using appropriate weighting factors, deliver a zero-th, a first, up to and including a p-th order component of the position address. A sub-function comprises all orders of the position address if all sub-function coefficients are not zero. A consequence of this is that in every row of the spline matrix, at least one of the multiplication factors is not zero. Of course, the portions of each of the basic p-th order spline functions should be selected such that the composition is a p-th order spline function.

Another embodiment of the invention has the advantage that the conversion from selected values into sub-function coefficients is very simple, as a minimal number of selected values is used to calculate the sub-function coefficients.

Therefore, each of the basic p-th order spline functions is only non zero during p+1 consecutive sections,. Thus, in every section, only p+1 portions of p+1 consecutive basic spline functions multiplied with p+1 consecutive selected values, respectively, are added. The sub-function coefficients of the sub-function obtained in this way are a simple linear combination of only p+1 consecutive selected values multiplied with portion coefficients determining the portions of the basic spline function. With p+1 portions, it is possible to generate any desired p-th order sub-function in every section.

In a next section, the portions added have the same shape but now are multiplied by p+1 consecutive selected values shifted by one with respect to the p+1 consecutive selected values in the preceding section. Thus, p consecutive selected values from the preceding section are again used in the succeeding section. This is based, as explained earlier, on the fact that at the border of the two sections, the value and all derivatives up to and including the (p-1)th derivative of the sub-functions must be equal to obtain a correction waveform which is a p-th order spline function. The above gives rise to a spline matrix which only has p+1 rows and p+1 columns. The conversion can be performed fast as a simple calculating device is used. It is an advantage if the conversion is fast, because then a more complex high order spline waveform can be generated without a need to calculate and store all p+1 sub-function coefficients of each of the n–p p-th order sub-functions, before these p-th order sub-functions can be calculated in real time in each section as a function of the stored sub-function coefficients and the position address. It is further advantageous that the conversion is simple to minimize the demands on the calculating device which then becomes cheap.

Another embodiment of the invention has the advantage that the needed number of stored values is considerably less if quadratic spline functions are used instead of linear functions. On the other hand, the implementation of a quadratic spline function is easier than that of a spline having a higher order, such as a cubic spline function, as due to the lower order, less multiplications of sub-function coefficients and polynomials of the position address are needed.

A further embodiment of the invention offers a very simple and inexpensive address generator for generating an address representing the spot position on the screen of the display tube.

It is common practice to generate the position dependent waveform as a function of a variable depending on the time, or depending on a line number. The position dependent waveform which is generated in this way depends on the amplitude and the frequency of the horizontal or vertical deflection. For example, suppose, the cathode ray tube display arrangement displays a PAL picture which has a vertical amplitude suitable to scan the screen along the whole height. A position dependent waveform depending on time is generated to obtain a certain correction, for example, an east-west correction. This waveform has a suitable shape and extends, during a vertical scan period, over the whole vertical height of the screen. If then, the amplitude of the vertical scan is decreased to scan only a part of the height of the screen, the generated position dependent waveform will have the same suitable shape extending during the same vertical scan period but now across only part of the height of the screen. As such, the values of the position dependent waveform occur at a wrong position, as now the same correction is performed on a smaller part of the screen. At different vertical frequencies (for example: 50 Hz PAL, 60

Hz NTSC, and 45 Hz free running) a different total number of lines appears (as the line frequency does not change significantly), and thus, a different position dependent waveform is generated as the lines at different vertical frequencies appear at different positions on the screen. Thus, the position address should be related to the vertical spot position to obtain a position dependent waveform independent of the frequency and amplitude of the vertical deflection. A same reasoning holds for a position waveform depending on the horizontal position on the screen.

The invention provides a position information signal (further referred to as address) generator based on the insight that the spot position on the screen is a linear function in time. The spot position is a linear function in time if the deflection current has a shape for obtaining a linear scan on the picture tube screen. Further, use is made of the fact that a certain deflection current corresponds to a certain position on the picture tube screen. As, in case of a linear scan, the spot position on the screen is a linear function of time, the address generator should generate an address which is a linear function in time. The address generator supplies an address which represents the spot position on the screen if the linear function in time representing the address is coupled to the linear function in time representing the spot position. Thus, the address generator supplies an address which is related to the spot position if two predetermined (desired) addresses occur at two selected levels of the deflection current to which belong two positions on the picture tube screen. The actual value of an address at a certain moment depends on the choice of the predetermined addresses which have to occur at the selected positions on the screen. As the address should be a linear function in time, the address is written as an initial position indication value (further referred to as initial value) added to an incremental value multiplied with the time. The initial value and the incremental value are determined from two measured moments on which the deflection current reaches the two selected values, respectively, and the values of the above mentioned predetermined addresses.

It is known to obtain a line position indication signal which indicates the vertical spot position on a raster scanned display screen for every line by using an analog-to digital converter (further referred to as ADC). The ADC measures a value of the vertical deflection current at a moment a line occurs. The vertical position of the spot, and thus of a line on the display screen, is determined by the value of the vertical deflection current in this line. Therefore, the ADC supplies a line position indication signal that is a measure of the vertical position of the spot on the screen. If a repetition frequency, or an amplitude of the vertical deflection current, changes, still the ADC supplies the actual vertical spot position at the moment a line occurs, as the vertical spot position is still determined by the vertical deflection current. The ADC must have a resolution of approximately 13 bits for display systems displaying about 600 lines. A striping would become visible on the screen if a lower resolution would be used. This striping is a brightness modulation caused by different distances between adjacent lines due to inaccuracy in the position of the lines. Such a high resolution ADC is expensive.

An embodiment of an address generator according to the invention, measures the two moments in time at which the two selected levels of the deflection current occur in a simple way by using two comparators, two latches and a counter. Each of the comparators detects whether a corresponding one of the selected levels is reached. The count value of the counter occurring at this moment is stored in a corresponding one of the latches.

These and other aspects will be described and elucidated with reference to the accompanying drawings.

DESCRIPTION OF THE PREFERRED EMBODIMENTS

Figure 1:
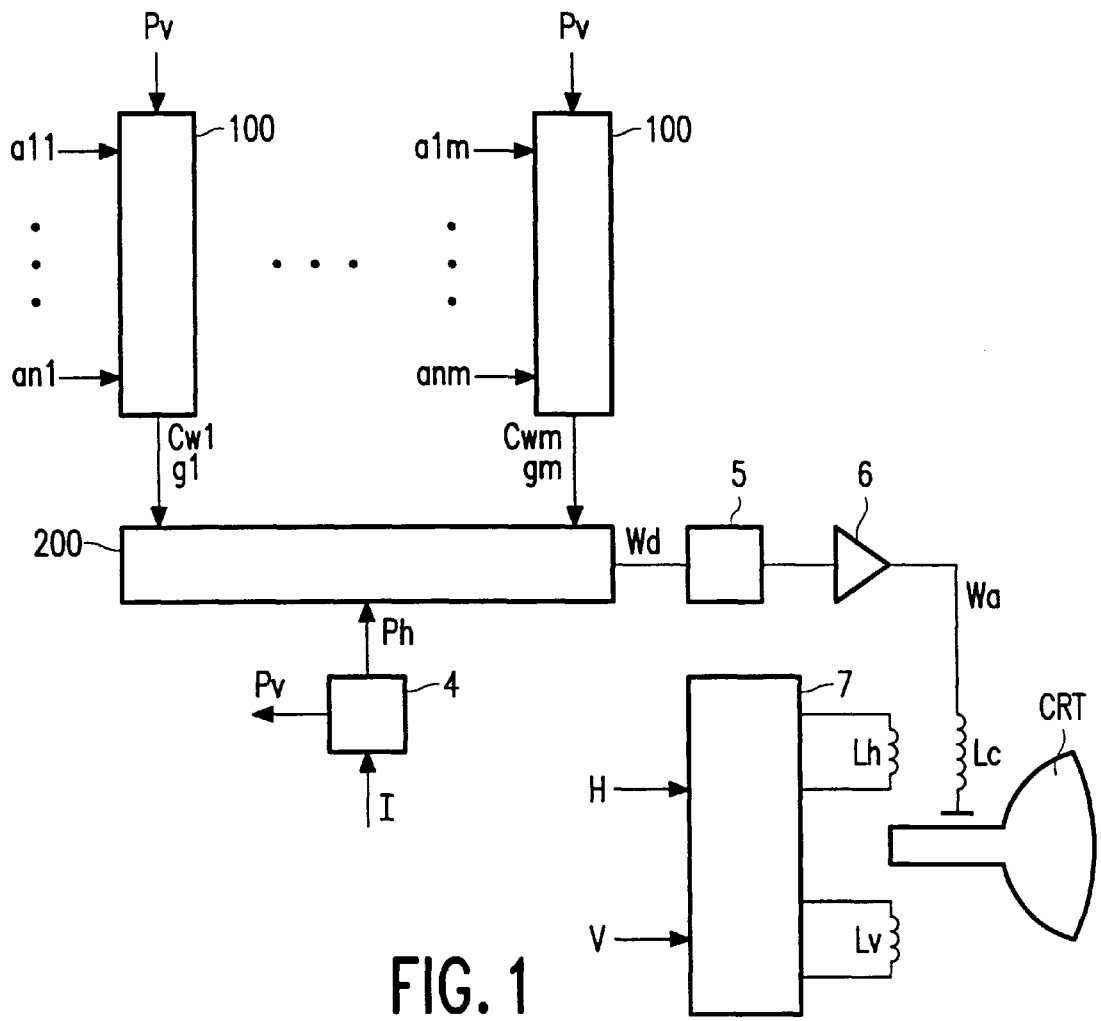
FIG. 1 shows a basic block diagram of a two-dimensional correction waveform generator according to the invention.

FIG. 1 shows a basic block diagram of a two-dimensional correction waveform generator according to the invention. The two-dimensional correction waveform generator comprises a position address determining circuit 4 receiving a position information I for supplying a horizontal position address Ph and a vertical address Pv. The position information I is related to a position on a display screen of a display device, for example, the position where an electron beam hits a screen of a cathode ray tube a deflection field. The a deflection field. The two-dimensional correction waveform generator further comprises a waveform generator 200 receiving the horizontal position address Ph and calculated coefficients gi for generating a digital correction waveform Wd in every line. Every one-dimensional waveform generator 100 receives the vertical position information Pv and stored values aij for generating, in every line, the calculated coefficients gi depending on the vertical position on the screen. In this way, the digital correction waveform Wd is a linear combination of functions of the horizontal position address Ph each multiplied with a corresponding calculated coefficient gi which depends on the vertical position information Pv. The digital correction waveform Wd thus depends on the horizontal and vertical position on the screen.

The digital correction waveform Wd is fed, via a series arrangement of a digital-to-analog converter 5 and an amplifier 6, as an analog correction waveform Wa to a correction coil Lc for influencing the deflection of the electron beam. The main deflection currents flowing through a horizontal and a vertical deflection coil Lh,Lv are generated from a horizontal and vertical synchronization information H,V by a deflection circuit 7. A correction current flowing through the correction coil Lc may also be coupled into the main deflection coil Lh or Lv, for example via a injection transformer. Then, the separate correction coil Lc is omitted.

The operation of the waveform generator will be elucidated with an example based on an application in a cathode ray tube (further referred to as CRT) projection television. The invention can also be used in other displays. The projection television comprises three CRT's each emitting one of three primary colors. The CRT's are positioned at an angle to have their respective images overlapping as much as possible for composing a color picture on a screen. If, without a pre-distorted geometry, each of the CRT's emits a same geometrical figure, these figures will not overlap each other on the screen due to the different angles of the CRT's with respect to the screen. Hence, the deflection geometry of the CRT's has to be pre-distorted to obtain overlapping or converged pictures on the screen. Two correction waveforms Wa may be generated to correct the geometry in horizontal and vertical direction of the picture generated by the CRT positioned central and representing green. The images on the CRT's representing red and blue have to be pre-distorted by generating appropriate currents through horizontal and vertical convergence coils Lc. Therefore, four two-dimensional correction waveforms Wd have to be generated which are used as reference signals for these currents. For convergence correction of raster scanned CRT's, usually, all the above mentioned correction waveforms Wd are generated in every line and depend on the horizontal and vertical position on the screen and on a number of adjustable predetermined (stored) values ai.

It was found that the deflection errors occurring in such a projection television can be corrected sufficiently accurate by using seven sets of five stored values ai. The seven sets of five stored values ai are used to generated a set of seven coefficients gi in every line. In every line, each of the coefficients gi out of a set of seven is calculated from every set of five stored values ai. This calculation is performed by the one-dimensional waveform generator shown in FIG. 2. The one-dimensional waveform generator generates a waveform Cw depending on the vertical position address Pv, and a set of five of the stored values aij, this waveform Cw having in every line, a value representing one of the seven coefficients gi. In this way, the seven coefficients gi are interpolated in every line from the only seven sets of five stored values ai. The waveform generator 200 calculates, every line from seven coefficients gi available in this line, the digital correction waveform Wd.

Figure 2:
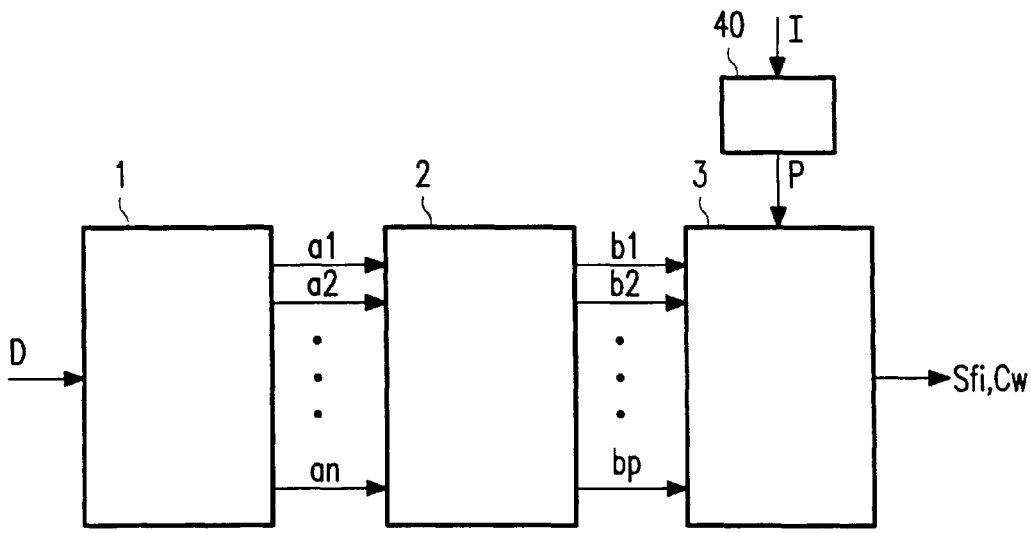
FIG. 2 shows a basic block diagram of a one-dimensional waveform generator according to the invention.

FIG. 2 shows a basic block diagram of a one-dimensional waveform generator according to the invention. The one-dimensional waveform generator generates a p-th order spline waveform Cw of a position address P. This waveform Cw may be used directly to influence the deflection of a picture tube CRT to correct a deflection error which is dependent on a position on the screen in one direction, for example, for correcting an east west error which only depends on the vertical position on the screen. The one-dimensional waveform generator may also generate a waveform Cw which represents the calculated coefficients gi as used in the two-dimensional waveform generator shown in FIG. 1. The waveform generator 200 of the two-dimensional correction waveform generator also converts coefficients (the calculated coefficients gi) into a waveform (the digital correction waveform Wd) which depends on only one position address (the horizontal position address Ph) and thus may also be configured as the one-dimensional waveform generator according to the invention.

The one-dimensional waveform generator comprises a position address determining circuit 40 receiving a position information I related to a position where an electron beam hits a screen of a cathode ray tube CRT under influence of a deflection field, for supplying the position address P. The position address P may be a horizontal or a vertical position address. The waveform Cw, which is a p-th order spline function, may be imagined to be a polynomial having terms of the position address P ranging from a power zero up to p. An associated coefficient is multiplied with every power of the position address P. The coefficients must be selected such that a spline waveform is obtained with a suitable shape, for example, for correcting a deflection distortion or for obtaining a dynamic focusing voltage or a correction signal to improve brightness uniformity of a displayed picture on the picture tube screen. The p-th order spline waveform Cw also may be imagined to be composed out of a linear combination of polynomials instead of powers of the position address P.

Figure 4:
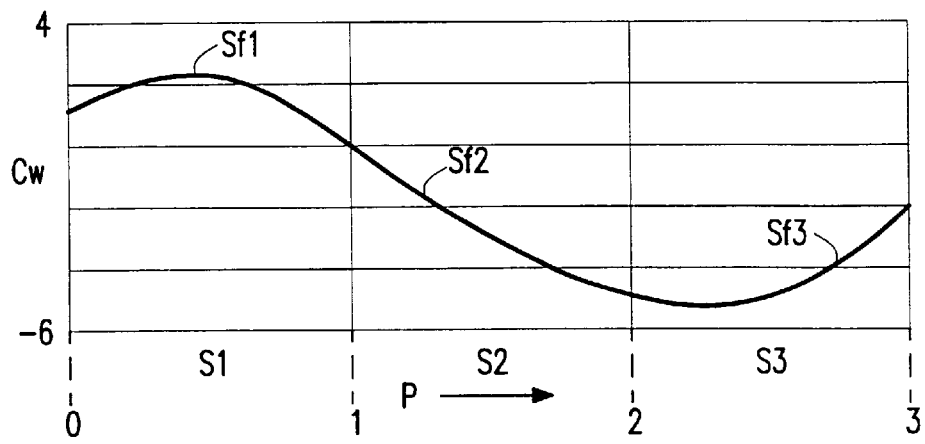
FIG. 4 shows a one-dimensional quadratic spline waveform generated based on the selected basic functions and predetermined values.

The invention uses the insight that a p-th order spline waveform Cw extending along the whole width or height of the picture tube screen can be generated as a chain of sections of p-th order sub-functions Sfi of the position address P. FIG. 4 shows three sub-functions Sf1, Sf2, Sf3 in three section S1,S2,S3. Each of the p-th order sub-functions Sfi comprises a linear combination of polynomials with maximum order p. Each polynomial is multiplied by an associated sub-function coefficient bi. The shape of the p-th order spline waveform Cw is determined by the sub-function coefficients bi used in each of the sections. Instead of the polynomials, also powers of the position address P may be used. The invention is related to a conversion of a limited amount of predetermined values ai into the sub-function coefficients bi in each of the sections Si. In this case, the predetermined values ai are stored in a memory 1. The stored values ai are determined such that a correction waveform Cw is obtained which has a shape optimally fitting the use of the correction waveform. The predetermined values ai are stored in the memory 1 via a data input D. The optimal stored values ai may be determined by an operator looking at a picture displayed on the screen. If n stored values ai are available, n–p p-th order sub-functions Sfi can be generated, each in one of n–p sections.

In every section Si, a conversion circuit 2 (FIG. 2) converts the stored values ai into the sub-function coefficients bi. A calculation circuit 3 calculates a sub-function Sfi from the sub-function coefficients bi and the position address P.

For clarity, the operation of the one-dimensional waveform generator is elucidated, by way of example, for a situation in which five predetermined or stored values ai are used, and in which the generated one-dimensional spline waveform Cw is a quadratic spline waveform, so n=5 and p=2.

The one-dimensional quadratic spline waveform Cw can be defined as a function composed of a chain of sub-functions Sfi being parabola sections. The parabola sections Sfi must fulfill two conditions to obtain a quadratic spline waveform Cw: they must be continuous and continuously differentiable with respect to the position address P at boundaries of the sections Si. Hence, there are no jumps or sharp bends in the quadratic spline waveform Cw. The number of sections Si is two less than the number of stored values ai. In the first section S1, any parabola section Sf1 can be generated by using three of the stored values ai. In every further section Sj, only one stored value ai is needed to define a further parabola section Sfj, as two constraints are imposed on the further parabola section Sfj at the boundary between this further parabola section Sfj and a preceding parabola section Sfi. Hence, three sections S1,S2,S3 are obtained by using five stored values a1,a2,a3,a4,a5. It is assumed that the width of each of the sections is chosen equal, The invention addresses the conversion, in each of the sections Si, of the five stored values ai into parabola coefficients or sub-function coefficients) bi. The conversion is the same in every section for the majority or all sub-function coefficients bi, and does not need to store intermediate results or any other values than the stored values ai. Further, a fast and simple conversion is realized to be able to calculate the parabola sections Sfi in real time.

The invention is based on the insight that it is possible to compose the quadratic spline waveform Cw out of a linear addition of basic functions Fbi which are quadratic spline functions each multiplied by one of the stored values ai. In this case, five basic functions Fbi are defined, an example of a set of basic functions Fbi is shown in FIG. 3.

The basic functions Fbi are composed out of a chain of basic section functions or portions pi, each portion pi extending over one section Si. FIG. 3 only shows the portions pi occurring in the three sections S1,S2,S3. The portions may be defined by polynomials having terms of the position address P ranging from a power zero up to 2. With every power of the position address P, an associated function coefficient cij is multiplied. The function coefficients cij are selected such that a basic function Fbi is obtained which is a quadratic spline function. The portions pi of the basic functions Fbi may also be defined to be composed out of a linear combination of polynomials instead of powers of the position address P.

Each of the parabola sections Sfi (which are the sub-functions which compose together the quadratic spline waveform Cw) may be imagined to be obtained by the addition of portions pi of the weighted basic functions Fbi in a section Si. The conversion from the stored values ai into the parabola coefficients bi can now be imagined as the process calculating the parabola coefficients bi out of the added portions pi of the basic functions Fbi in a section Si, wherein each of the portions pi is multiplied with an associated stored value ai. In other words, the addition of the portions pi of the basic functions Fbi each multiplied with a stored value ai provides a parabola function (the parabola section Sfi), which may be written as an addition of a zero order component of the position address P multiplied with a first parabola coefficient b1, a first order component of the position address P multiplied with a second parabola coefficient b2, and a second order component of the position address P multiplied with a third parabola coefficient b3. Each of the parabola coefficients bi is a linear combination of the function coefficients cij weighted by the stored values ai associated with the added portions pi of the basic functions Fbi. It is not essential to the invention that the parabola function is written as is described above, the parabola function may, for example, also be written in polynomial terms, for example as an addition of a zero order component of the position address P, a first order component, and a multiplication of two different first order components (for example: b0+b1.P+b2.P(P−1)).

Figure 3:
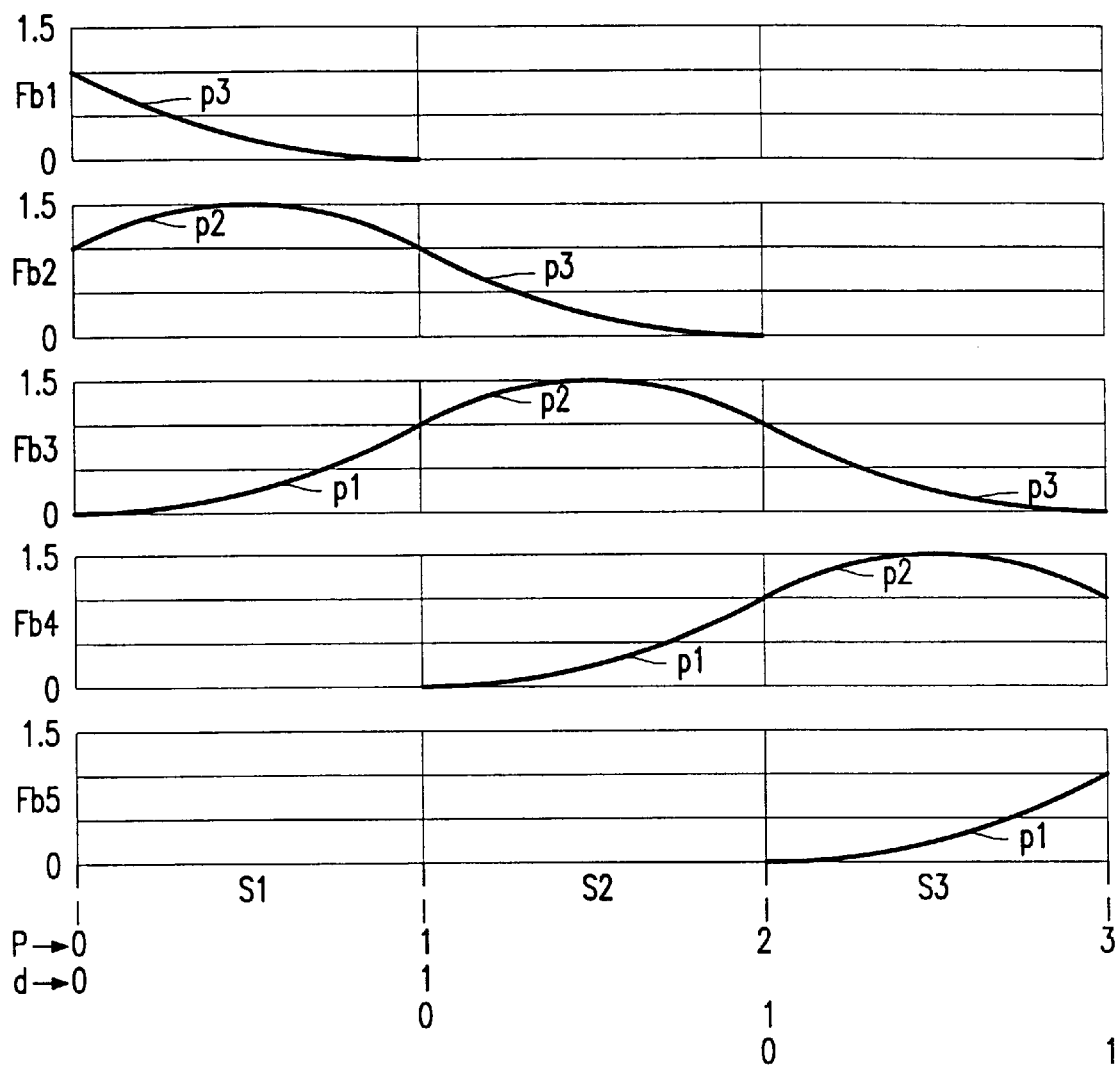
FIG. 3 shows an example of a set of basic functions selected according the invention.
Figure 6:
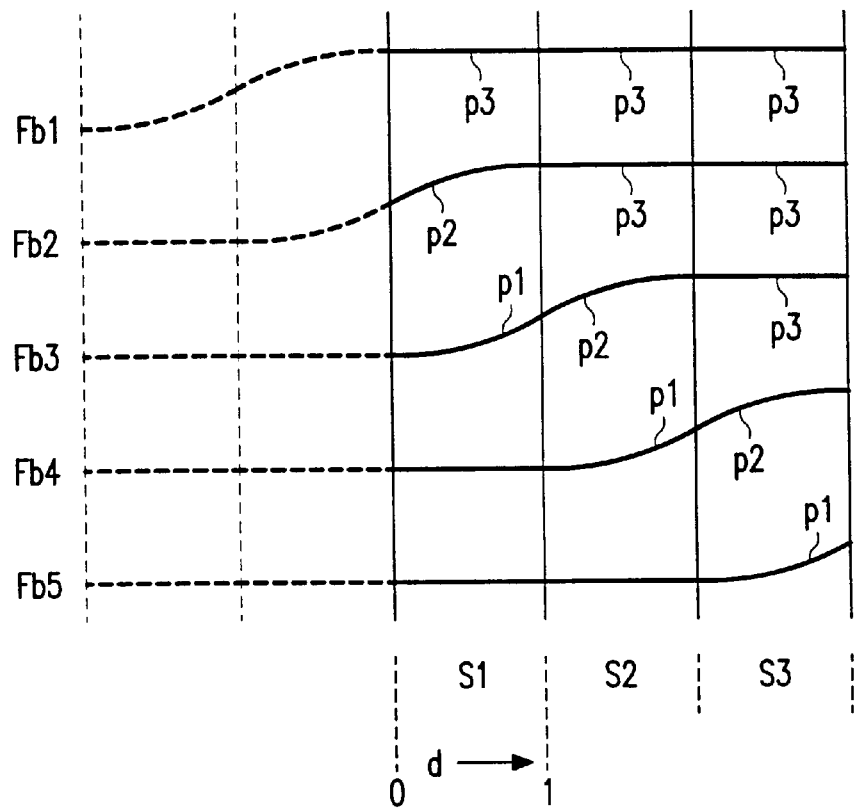
FIG. 6 shows another example of a set of basic functions selected according the invention.

The basic functions Fbi are copies of each other which are shifted over one section Si (FIG. 3). Hence, the portions pi, which together compose one of the basic functions Fbi, will repeat in every section Si as portions pi, of different basic functions Fbi. Thus, in every section Si, always the same portions pi of the different basic functions Fbi are added, only the weighting factors or stored values ai differ. This means that the process of converting the stored values ai into parabola coefficients (or sub-function coefficients) bi is the same in every section Si: the parabola coefficients bi are the same linear combination of different stored values ai in every section Si. Examples of basic functions which are shifted over one segment are shown in FIG. 3 and FIG. 6.

FIG. 3 shows portions of five basic functions Fb1 up to Fb5 in the three available segments S1,S2,S3. A relative address d runs from zero to one in each of the sections Si. A first portion p1 of each of the basic functions is defined by (see the portion p1 of Fb4 in segment S2):

$$p1(d)=d^2=d+d.(d-1).$$

A second portion p2 of each of the basic functions is defined by (see the portion p2 of Fb3 in segment S2):

$$p2(d)=1-2.d.(d-1).$$

A third portion p3 of each of the basic functions is defined by (see the portion p3 of Fb2 in segment S2):

$$p3(d)=(d-1)^2=1-d+d.(d-1).$$

The portions pi defined above should be looked at as an advantageous example. In case of quadratic spline basic functions Fbi, a more generic expression of a portion pi would be:

$$pi(d)=c1i+c2i.d+c3i.d(d-1).$$

Hence, the portion p1 is a special choice wherein the function coefficients cij are defined as c11=0, c21=1 and c31=1. The other function coefficients are c12=1, c22=0, c32=−2, c13=1, c23=1, and c33=1. In another generic expression, powers of the relative position address d are used in a linear combination. In an even more generic expression, each of the portions is composed out of a linear combination of polynomials of the relative position address d.

The sub-functions Sfi, which are parabola sections in this example, are a linear combination of the portions pi of the basic functions Fbi weighted with an associated stored value ai. In the first section S1, the sub-function Sf1 can be written as:

$$Sf1(d,ai)=a1.p3(d)+a2.p2(d)+a3.p1(d)$$

This can be rewritten as:

$$\begin{aligned}Sf1(d, ai) &= a3 \cdot c11 + a2 \cdot c12 + a1 \cdot c13 + \\ &\quad (a3 \cdot c21 + a2 \cdot c22 + a1 \cdot c23) \cdot d + \\ &\quad (a3 \cdot c31 + a2 \cdot c32 + a1 \cdot c33) \cdot d \cdot (d-1) \\ &= b1 + b2 \cdot d + b3 \cdot d \cdot (d-1)\end{aligned}$$

Thus, each of the parabola coefficients bi is a linear combination of function coefficients ci weighted by the stored values ai associated with the added portions pi of the basic functions Fbi in one segment Si.

This conversion can be written as:

$$\begin{pmatrix} b1 \\ b2 \\ b3 \end{pmatrix} = \begin{pmatrix} c11 & c12 & c13 \\ c21 & c22 & c23 \\ c31 & c32 & c33 \end{pmatrix} \cdot \begin{pmatrix} a3 \\ a2 \\ a1 \end{pmatrix}$$

After substitution of the values of the function coefficients cij as determined earlier, this expression becomes:

$$\begin{pmatrix} b1 \\ b2 \\ b3 \end{pmatrix} = \begin{pmatrix} 0 & 1 & 1 \\ 1 & 0 & -1 \\ 1 & -2 & 1 \end{pmatrix} \cdot \begin{pmatrix} a3 \\ a2 \\ a1 \end{pmatrix}$$

which corresponds to:

$$Sf1(d,ai) = a1+a2+(-a1+a3).d+(a1-2.a2+a3).d.(d-1)$$

Therefore, with the basic functions Fbi selected, as shown in FIG. 3, in the first section SI, the parabola coefficients bi are calculated as:

$$b1 = a1+a2$$
$$b2 = -a1+a3$$
$$b3 = a1-2.a2+a3$$

In the second section S2, the sub-function Sf2 can be written as:

$$Sf2(d,ai) = a2.p3(d)+a3.p2(d)+a4.p1(d)$$

or, written differently:

$$\begin{pmatrix} b1 \\ b2 \\ b3 \end{pmatrix} = \begin{pmatrix} c11 & c12 & c13 \\ c21 & c22 & c23 \\ c31 & c32 & c33 \end{pmatrix} \cdot \begin{pmatrix} a4 \\ a3 \\ a2 \end{pmatrix} = \begin{pmatrix} 0 & 1 & 1 \\ 1 & 0 & -1 \\ 1 & -2 & 1 \end{pmatrix} \cdot \begin{pmatrix} a4 \\ a3 \\ a2 \end{pmatrix}$$

This is the same expression as found in the first section S1, only the stored values ai have been linearly shifted. Hence, if the basic functions Fbi are copies of each other which are shifted over one segment, a general expression determining the parabola sections Sfi in each section Si is:

$$Sfi(d,ai) = c11.as3+c12.as2+c13.as1+(as3.c21+as2.c22+as1.c23).d+\\(as3.c31+as2.c32+as1.c33).d.(d-1)$$

wherein:
   d is the relative position address used within each of the segments Si, and as1,as2,as3 is a switched subset of the stored values ai.

The sub-function coefficients bij in section Sj can be calculated from the selected values asi according to:

$$\begin{pmatrix} b1j \\ b2j \\ b3j \end{pmatrix} = \begin{pmatrix} c11 & c12 & c13 \\ c21 & c22 & c23 \\ c31 & c32 & c33 \end{pmatrix} \cdot \begin{pmatrix} as3 \\ as2 \\ as1 \end{pmatrix} = \begin{pmatrix} 0 & 1 & 1 \\ 1 & 0 & -1 \\ 1 & -2 & 1 \end{pmatrix} \cdot \begin{pmatrix} as3 \\ as2 \\ as1 \end{pmatrix}$$

The in this way generated quadratic spline waveform Cw can be imagined to be composed out of a linear addition of the basic functions Fbi each multiplied by one of the stored values ai:

$$Cw(P) = a1.Fb1(P)+a2.Fb2(P)+a3.Fb3(P)+a4.Fb4(P)+a5.Fb5(P),$$

wherein P is an absolute address, ranging from zero at a start of the first section S1 to a maximum value at an end of the third section S3. A quadratic spline correction waveform Cw obtained if a1=−1, a2=2, a3=−2, a4=−3, and a5=1 is shown in FIG. 4.

In each of the sections Si, only three stored values ai contribute in the parabola coefficients bi, as the basic functions Fbi used in this example are only non-zero in three consecutive sections Si.

The shape of each of the portions pi which are associated with a certain stored value ai can be found as the difference between a first one-dimensional waveform generated with a first set of stored values ai and a second one-dimensional waveform generated with a second set of stored values ai, wherein only this certain stored value ai differs with respect to the first set of stored values ai. The same holds for a chain of portions pi associated with a certain coefficient.

The known quadratic spline waveform generator calculates the sub-functions Sfi by using the expression:

$$Sfi(p) = b1i+b2i.p+b3i.p^2$$

wherein, for simplicity, p is introduced to be a relative address running from 0 to 1 in each section Si.

In a first section S1, the sub-function coefficients bi are chosen to be the first three stored values ai:

$$b11=a1, b21=a2, b31=a3$$

This substituted in the sub-function expression delivers:

$$Sf1(p) = a1+a2.p+a3.p^2$$

the first derivative is:

$$dSf1(p) = a2+2.a3.p$$

In a second section S2, the sub-function Sf2 and its derivative dSf2 are determined by:

$$Sf2(p) = b12+b22.p+b32.p^2$$

$$dSf2(p) = b22+2.b32.p$$

As the total waveform is a quadratic spline function, the sub-function coefficients bi of the sub-function Sf2 in the second section S2 are calculated from the expressions:

$$Sf2(0) = b12 = Sf1(1) = a1+a2+a3$$

$$dSf2(0) = b22 = dSf1(1) = a2+2.a3$$

the sub-function coefficient bi belonging to the $p^2$ term is chosen to be a new stored value ai:

$$b32 = a4.$$

In a third section S3, the sub-function Sf3 and its derivative dSf3 are determined by:

$$Sf3(p) = b13+b23.p+b33.p^2$$

$$dSf3(p) = b23+2.b33.p$$

As the total waveform is a quadratic spline function, the sub-function coefficients bi of the sub-function Sf3 in the third section S3 are calculated from the expressions:

$$Sf3(0) = b13 = Sf2(1) = b12+b22+b32 = a1+a2+a3+a2+2.a3+a4$$

$$dSf3(0) = b23 = dSf2(1) = b22+2.b32 = a2+2.a3+2.a4$$

the sub-function coefficient bi belonging to the $p^2$ term is chosen to be a new stored value ai:

$b33=a5$.

The above shows clearly that the conversion process of calculating the sub-function coefficients bi from stored values ai becomes more complex in every further section Si. This conversion process is thus not the same in every section Si for a majority or all of the sub-function coefficients bi. It can also be seen that, in a section Si, the sub-function coefficient bi associated to the zero order tern of the relative position d depends on sub-function coefficients bi of all preceding sections Si.

The parabola sections Sfi, according to the invention, can be calculated in real time from the stored values ai, as the calculation of the parabola coefficients bi is very simple. Such a simple calculation can be performed fast enough to avoid that first all parabola coefficients bi have to be calculated and stored before the parabola sections Sfi can be calculated in real time.

FIG. 6 shows another example of five basic functions Fb1 up to Fb5 in the three available segments S1,S2,S3. A first portion p1 of each of the basic functions is defined by (see the portion p1 of Fb3 in segment S1):

$$p1(d)=d^2$$

A second portion p2 of each of the basic functions Fbi is defined by (see the portion p2 of Fb2 in segment S1):

$$p2(d)=1+2.d-d^2$$

A third portion p3 of each of the basic functions is defined by (see the portion p3 of Fb1 in segment S1):

$$p3(d)=2$$

Wherein the position address d again is a relative address running from zero to one within each of the segments Si.

In a same way as described above for the basic functions Fbi, shown in FIG. 3, the conversion from the stored values ai into the sub-function coefficients bi can be calculated to be,
in the first segment S1:

$$b11=2.a1+a2$$

$$b21=2.a2$$

$$b31=-a2+a3$$

in the second segment S2:

$$b12=2.a1+2.a2+a3$$

$$b22=2.a3$$

$$b32=-a3+a4$$

in the third segment S3:

$$b13=2.a1+2.a2+2.a3+a4$$

$$b23=2.a4$$

$$b33=-a4+a5$$

wherein the sub-functions Sfi are written as:

$$Sfi(p)=b1i+b2i.p+b3i.p^2$$

The first sub-function coefficient bi is not the same linear combination in every section Si, as the basic functions Fbi are non zero in more than three succeeding sections Si. The sub-function coefficients b2 and b3 are the same in each section, only the associated stored values ai differ. Again, the sub-function coefficients bi can be calculated from the stored values ai in a very simple way.

In this situation, it is possible to use a same conversion in every section Si by adapting the selection of selected values asi from the stored values ai as described below. In every section Si, five selected values asi are selected from the array of five stored values ai. In the first section S1, the first two selected values as1,as2 are selected outside the array of stored values. The selected values asi selected outside the array are chosen to be zero. The next three selected values as3,as4,as5 are selected to be the consecutive stored values a1,a2,a3, respectively. In the second section the indices of the stored values are incremented by one: the four selected values as2,as3,as4,as5 are selected to be a1,a2,a3,a4, respectively, and only the first selected value as1 is selected outside the array and thus will be zero. In the third segment, all selected values asi are selected within the array and thus are equal to the stored values with a same index. Hence, if a new array is imagined which comprises the consecutive elements 0,0,a1,a2,a3,a4,a5, the selection of the selected values asi can be imagined to select five consecutive elements starting in the first section S1 with the first five elements (0,0,a1,a2,a3), and succeeding in the second section S2 with selecting five consecutive elements with indices one higher (0,a1,a2,a3,a4), and so on. The process of converting, for a sub-function Sfi in section Si, the stored (or predetermined) values ai into the sub-function coefficients bi can be described by the next expression:

$$Sfi(p)=2.as1+2.as2+2.as3+as4+2.as4.d+(-as4+as5).d^2$$

and by selecting the selected values asi as described before.
In the first section S1 is obtained:

$$Sf1(p)=2.0+2.0+2.a1+a2+2.a2.d+(-a2+a3).d^2$$

In the second section S2 is obtained:

$$Sf2(p)=2.0+2.a1+2.a2+a3+2.a3.d+(-a3+a4).d^2$$

And in the third section S2 is obtained:

$$Sf3(p)=2.a1+2.a2+2.a2+a4+2.a4.d+(-a4+a5).d^2$$

In this way, even if basic functions Fbi are used which comprise a number of consecutive portions pi which are non zero, whereby the number is higher than p+1, it is possible to use the same program in a computer or the same hardware to convert the predetermined values ai into the sub-function coefficients bi.

Figure 5:
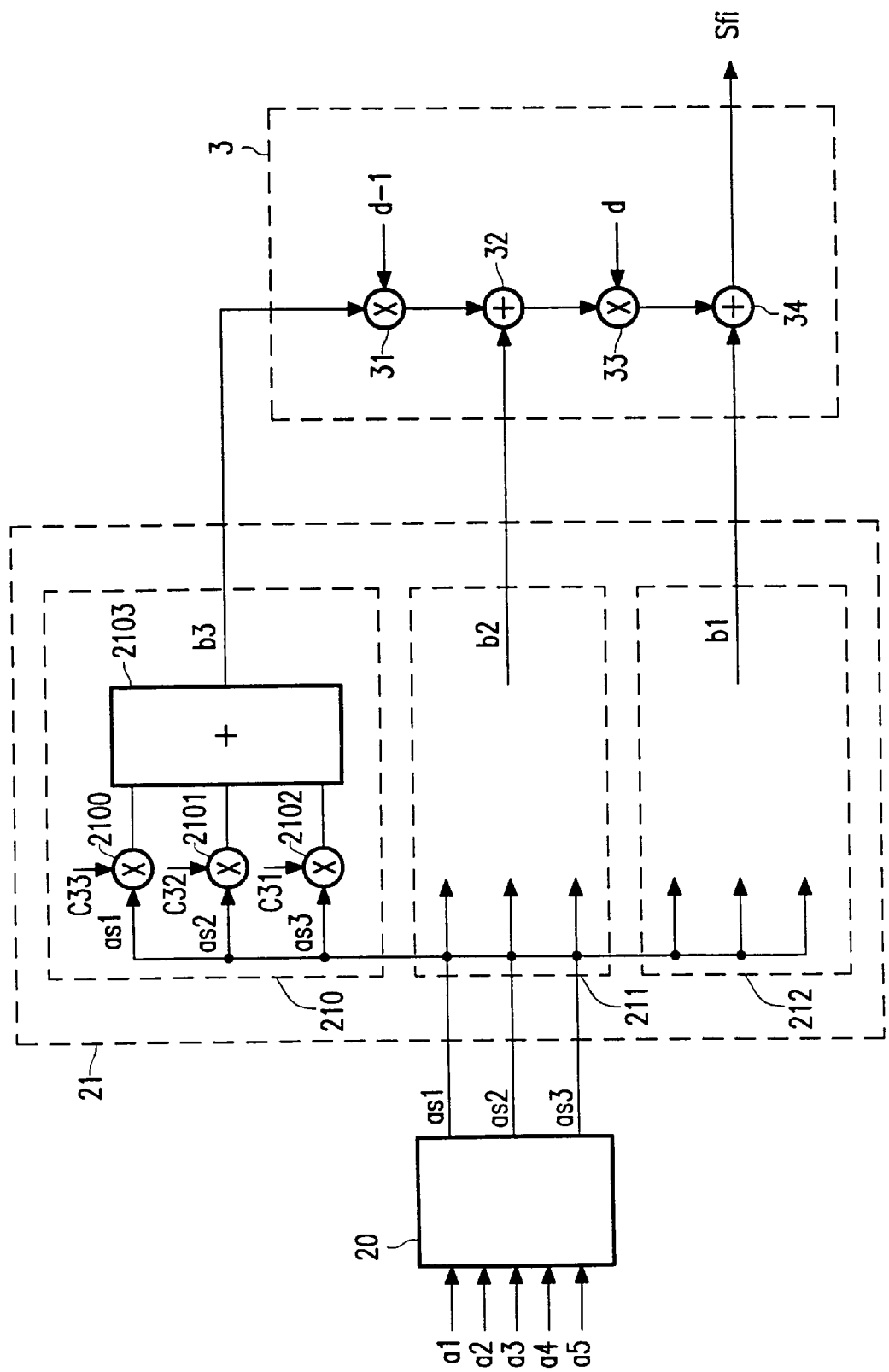
FIG. 5 shows a circuit according an embodiment of the invention for calculating sub-functions from the predetermined values.

FIG. 5 shows a circuit according to an embodiment of the invention for calculating each of the sub-functions Sfi from the stored values ai in each of the sections Si. This embodiment is based on the example of basic functions Fbi as shown in FIG. 3.

A selection circuit 20 receives the five stored values ai for supplying a selection of three stored values asi to a conversion circuit 21. In the first section S1 the selected stored values as1,as2,as3 are a1,a2,a3 respectively. In the second section S2 the selected stored values as1,as2,as3 are a2,a3,a4 respectively. In the third section S3 the selected stored values as1,as2,as3 are a3,a4,a5 respectively.

In this example, the conversion circuit 21 comprises three sub-conversion circuits 210,211,212 which each convert the three selected stored values asi into one of the three parabola or sub-function coefficients bi. The first sub conversion circuit 210 comprises a first, second and third multiplier 2100,2101,2102 and an adder 2103. The first multiplier 2100 receives the first selected stored value as1 and an associated function coefficient c33 (which is 1 in the above described example), for generating a first output value which is a multiplication of the selected stored value as1 with the associated function coefficient c33 (the function coefficients cij are determined by the choice of the basic functions Fbi). The second multiplier 2101 receives the second selected stored value as2 and an associated function coefficient c32 (which is 1 in the above described example), for generating a second output value which is a multiplication of the selected stored value as2 with the associated function coefficient c32. The third multiplier 2102 receives the third selected stored value as3 and an associated function coefficient c31 (which is 0 in the above described example), for generating a third output value which is a multiplication of the selected stored value as3 with the associated function coefficient c31. The adder 2103 receives the first, second and third output values to supply the first sub-function coefficient b3 which is the sum of the first, second and third output values. In a same way, the second and third sub-conversion circuits 211,212 convert the three selected stored values as1,as2,as3 into the second and third sub-function coefficients b2,b1. The second and third sub-conversion circuits 211,212 have the same topology as the first sub conversion circuit 210, only different function coefficients cij are used. Instead of multipliers 2100,2101,2102, also bit shifters can be used, as the function coefficients cij are very simple.

The calculation circuit 3 comprises: a first multiplier 31 for multiplying the first parabola coefficient b3 with a function of the position address being d−1, a first adder 32 for adding a second parabola coefficient b2 to the result obtained by the first multiplier 31, a second multiplier 33 for multiplying the result of the first addition with the relative position address d, and a second adder 34 for adding a third parabola coefficient b1 to the result of the second multiplier 33. The second adder 34 supplies the parabola sections Sfi which together compose the quadratic spline waveform Cw. It is possible to use another first order polynomial than the function d−1 of the relative position address d to be multiplied with the first parabola coefficient b3. It is also possible to use one hardware multiplier instead of the first and the second multiplier 31,34, but then an intermediate result has to be stored. It is further possible to replace a part of or the complete circuit by a suitably programmed computer.

Although the above-used example is limited to the generation of a quadratic spline waveform Cw from five stored values ai, it is obvious for one skilled in the art how to generate a higher order spline waveform Cw, or a spline waveform using a different amount of stored values ai. Still, the same conversion circuit can be used in every section Si to convert the selected stored values asi into the sub-function coefficients bi if more stored values ai are available to generate a spline waveform Cw which has the same order. If a higher order spline waveform Cw is generated, lets assume a p-th order, next adaptations have to be made: (a) the calculation circuit 3 has to generate sub-functions the p having the p-th order, (b) the conversion circuit 21 has to generate p+1 sub-function coefficients bi for determining the p-th order sub-functions Sfi, (c) each of the sub-function coefficients bi has to calculated as a linear combination of function coefficients cij weighted with selected stored values asi. The number of selected stored values asi depends on the freedom of choice wanted in generating the waveform Cw. This number should be at least p+1 if full freedom is wanted (all p-th order sub-functions can have all shapes possible, as long as the resulting waveform Cw is a p-th order spline function). The function coefficients cij depend on a choice of the basic functions, as explained above.

FIG. 1 shows a cathode ray display apparatus with a position indication signal (or address) generator 4 according to the invention, which will be described below.

Figure 8:
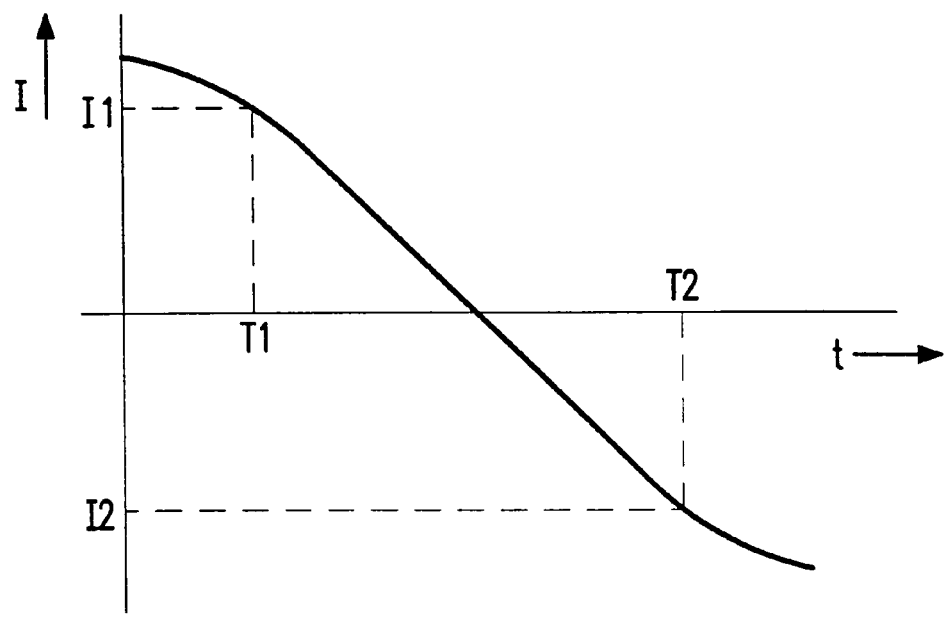
FIG. 8 shows a waveform of a deflection information being related to a deflection current.
Figure 9:
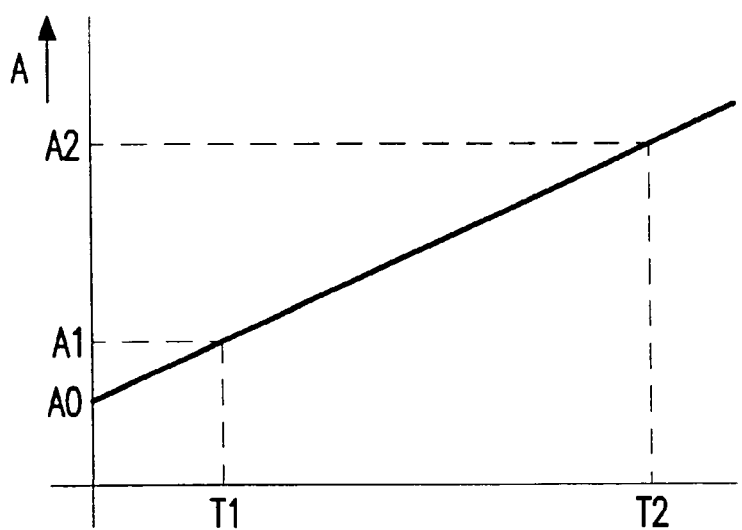
FIG. 9 shows a waveform representing the address.

FIG. 8 and 9 show waveforms elucidating the operation of the address generator 4. FIG. 8 shows a waveform of a position information I being related to a deflection current Ih;Iv. The deflection current Ih;Iv may be the vertical Iv or horizontal Ih deflection current.

The address generator 4 has to supply an address A (untill now referred as P) which is a linear function in time, as is shown in FIG. 9:

$$A(t)=A0+dA.t$$

wherein A0 is an initial value and dA an incremental value. The address A is related to the spot position if two desired addresses A1,A2 occur at two selected levels of the deflection current Ih;Iv. This holds if the deflection current Ih;Iv has a shape for obtaining a substantially linear scan on the screen of the cathode ray tube CRT. Under this condition, the spot position on the screen is a substantially linear function of time.

Two positions on the screen belong to two selected levels of the deflection current Ih;Iv. These two selected levels of the deflection current are represented by two levels I1,I2 of the position information I, see FIG. 8. These two levels I1,I2 occur at two moments T1,T2, respectively. The address A is generated to obtain the two desired addresses A1,A2 at the two moments T1,T2, respectively. This will be further elucidated below.

Figure 7:
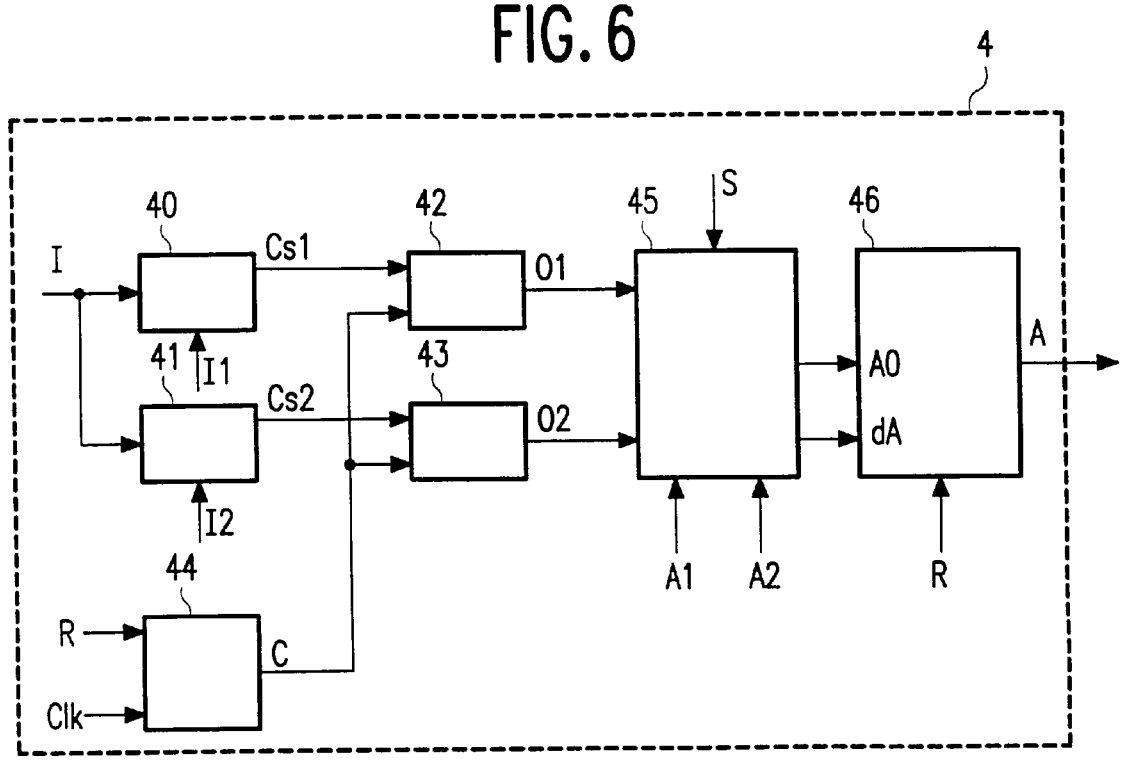
FIG. 7 shows an address generator according to an embodiment of the invention.

An address generator 4 according to the invention is shown in FIG. 7. This address generator 4 comprises a first and a second comparator 40,41 both receiving a position information I which is related to the deflection current and reference levels indicating the two levels I1,I2 for supplying a first and second comparator signal Cs1, Cs2, respectively, to a first and a second latch 42,43. The position information I may, for example, be obtained (not shown) in a known manner from the deflection current Ih;Iv via a current transformer, or a resistor through which the deflection current flows, or, if the deflection current Ih;Iv is generated by a power amplifier in a feedback loop, by a reference waveform to which the deflection current Ih;Iv is compared. Instead of the latches 42,43 any other storage circuit may be used.

A counter 44 receives a reset signal R occurring during a flyback period, and a clock signal Clk which is summed during the trace period to obtain a count value C which is supplied to a further input of both the first and second latch 42,43. A first calculation unit 45 receives an output value O1 from the first latch 42, and an output value O2 from the second latch 43, to calculate the initial value A0 and the incremental value dA. The first calculation unit 45 receives a start information S indicating that new initial and incremental values A0,dA have to be calculated. The start informations may be related to the second moment T2 as after this second moment T2, all necessary information for the calculation is available. The start information may also be the reset signal R. A second calculation unit 46 calculates the address A to supply the address A according to the expression:

$$A(t)=A0+dA.t.$$

The second calculation unit 46 receives the reset signal R indicating that the new initial and incremental values A0,dA, calculated by the first calculation unit 45, have to be used to calculate the address A in a next field or line. It is possible to combine the first and second calculation units 45,46 in one calculation unit.

If the address A represents a vertical position of horizontal scanned lines, the above expression may be written as:

$$A \text{ (line)} = A0 + \sum_{i=1}^{i=line} dA$$

wherein the address A is calculated to be the initial value A0 to which is added in every line the incremental value dA. In this case, the second calculation unit 46 only needs to perform additions in every line instead of multiplying the incremental value dA with the time t.

The first and second comparator signals Cs1,Cs2 indicate two moments in time T1,T2 (FIG. 8) at which two selected levels I1,I2 of the position information I occur, which correspond to the two selected levels of the deflection current Ih;Iv. A first count value C1 generated by the counter 44 is stored by the first latch 42 at the moment T1 that the first comparator signal Cs1 indicates that the position information I has the first selected value I1. The second latch stores in the same way a second count value C2 at the moment that the second comparator 41 indicates that the position information I has the second wished value I2. The clock signal CLK needs to have a sufficient high repetition rate to be able to obtain sufficiently accurate count values C1 and C2. The first calculating unit 45 calculates the initial value A0 and the incremental value dA from the first and second stored values C1,C2 knowing that these values represent the time moments T1,T2 at which the desired address values A1 and A2 should occur, respectively. The initial value A0 and the incremental value dA are defined by the formulae:

$A0=(T1.A2-T2.A1)/(T1-T2)$ $dA=(A1-A2)/(T1-T2)$

These formulae follow from a simple substitution of the measured moments T1,T2 and the desired address values A1,A2 occurring at these moments in the linear function representing the address A. Hence, an address generator is realized for calculating, with the second calculation unit 46, an address A from the initial value A0 and the incremental value dA in such a way that at the moment the first comparator 40 detects a first selected level of the deflection current, the address A is equal to the first desired address value A1, and that at the moment the second comparator 41 detects a second selected level of the deflection current, the address A is equal to the second desired address value A2. The selected values of the deflection current Ih;Iv have to be selected such that in every display mode (for example a vertical compress mode to display pictures having a 16:9 aspect ration on a picture tube having a 4:3 aspect ratio), the deflection current Ih;Iv covers these values. Preferably, the selected values of the deflection current Ih;Iv are selected as far away as possible from each other to obtain a maximal accuracy. In case the position address A represents the vertical position on the screen, in the way described above, it is possible to obtain an address A which for every horizontal line represents the vertical spot position on the screen, independent of the deflection amplitude or frequency. This will be further elucidated in the description of FIGS. 10, 11, 12 and 13.

The address A in a certain line may be generated by adding the incremental value dA to the address A of a line preceding the certain line. This addition can be performed with a suitably programmed computer, or with the second calculating unit 46 adapted to be a hardware adder. Also the counter 44, the first and second latches 42,43 and the first calculating unit 45 may be replaced by a suitably programmed computer.

An offset value has to be added to the initial value A0, depending on the field, if a picture is composed by interlaced fields.

The address generator 4, according to the invention, also supplies an address A which is independent of the deflection amplitude or frequency, if the deflection current has a shape for obtaining only an approximate linear scan on the screen instead of a substantial linear scan. This is based on the insight that the absolute accuracy is not very important, as a small difference between the actual spot position and the address A (a few lines if the address A is the vertical address) still produces an acceptable waveform. This difference causes a fixed error which will be compensated for by adjusting the shape of the waveform. In case the waveform generator is used to generate convergence waveforms, the differential accuracy of a vertical address from field to field is also not very critical, the difference should be below about one-eight of a distance between two consecutive lines to obtain a good interlace. The differential accuracy (in case of a vertical address: from line to line) must be very high, otherwise striping occurs. As the address A is a linear function, this only imposes a condition on the number of bits used to represent the address, this number must be high enough (about 14 bits in the vertical direction) to avoid striping. It is especially this high demand on differential accuracy that makes the known ADC expensive.

Figure 10:
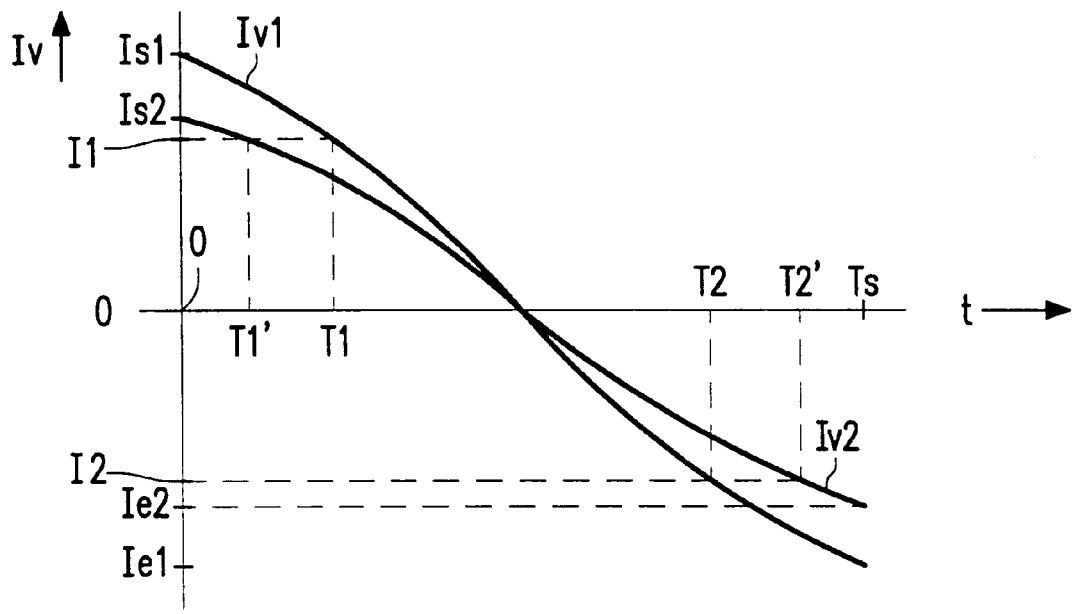
FIG. 10 shows a graph of two waveforms representing two vertical deflection currents which have different amplitudes.

FIG. 10 shows a graph of two waveforms representing two vertical deflection currents Iv1,Iv2 which have different amplitudes during a scan period with a duration Ts. A first vertical deflection current Iv1 starts at moment 0 with a start current value Is1, and ends at the moment Ts with an end current value Ie1. A second vertical deflection current Iv2 starts at moment 0 with a start current value Is2≦Is1, and ends at moment Ts with an end current value Ie2≦Ie1. As an example, both vertical deflection currents Iv1,Iv2 are S-corrected sawtooth waveforms which cause an approximately linear vertical scan on the cathode ray tube screen. The first and second vertical deflection currents Iv1,Iv2 reach a first predetermined value I1 at moments T1 and T1', respectively. The first and second vertical deflection currents Iv1,Iv2 reach a second predetermined value I2 at moments T2 and T2', respectively.

Figure 11:
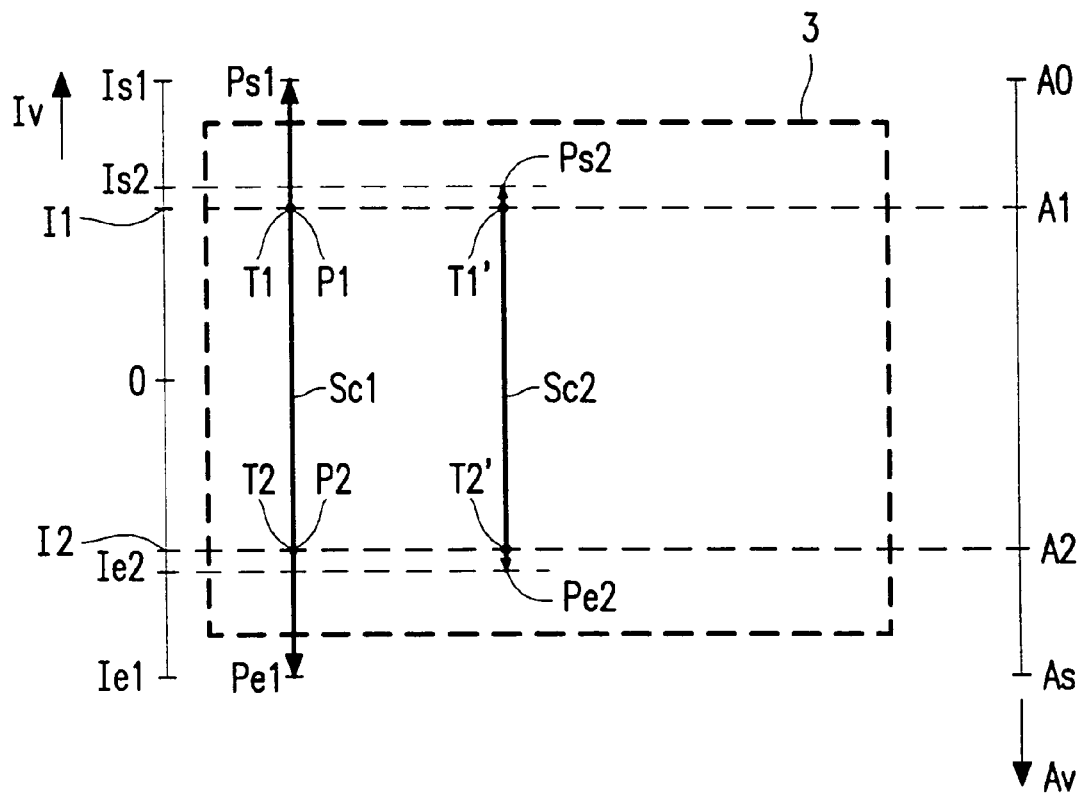
FIG. 11 shows a picture to elucidate the relation between the vertical deflection current, the vertical position on the screen and the position indication signal with respect to the two vertical deflection currents shown in FIG. 10.

FIG. 11 shows a picture to elucidate the relation between the vertical deflection current Iv, the vertical position on the screen and the position indication A with respect to the vertical deflection currents Iv1,Iv2 shown in FIG. 10. The dashed line 3 represents a cathode ray tube screen with an aspect ratio of 4:3. The line positioned left from the screen 3 indicates values of the vertical deflection current Iv. At this line are indicated: the start current Is1 and end current Ie1 related to the first vertical deflection current Iv1 as shown in FIG. 4; the start current Is2 and end current Ie2 related to the second vertical deflection current Iv2; and the first and second predetermined vertical deflection current values I1,I2. A certain value of the vertical deflection current Iv corresponds, in a one-to-one relation, with a certain vertical position on the screen 3. The first line Sc1 indicates the scanned part of the screen 3 belonging to the first vertical deflection current Iv1. The first line Scd starts at the vertical position Ps1, corresponding to the start current Is1 and ends at the vertical position Pe1, corresponding to the end current Ie1. In this example, the first vertical deflection current Iv1 is chosen to obtain a vertical scan larger than the height of the screen 3. The second line Sc2 indicates the scanned part of the screen 3 belonging to the second vertical deflection current Iv2. The second line Sc2 starts at the vertical position Ps2, corresponding to the start current Is2, and ends at the vertical position Pe2, corresponding to the end current Ie2. In this example, the second vertical deflection current Iv2 is chosen to obtain a vertical scan smaller than the height of the screen 3, for example, for displaying a display information with an aspect ratio of 16:9.

The predetermined vertical deflection current values I1,I2 correspond to the vertical positions P1 and P2, respectively. The references T1, T1' associated with the vertical position P1, denote the moments at which the first and the second vertical deflection currents Iv1,Iv2 reaches the first predetermined value I1, respectively (see also FIG. 4). The references T2, T2' denote the moments at which the first and the second vertical deflection currents Iv1,Iv2 reach the second predetermined value I2, respectively.

The line positioned right of the screen 3 indicates values of the vertical spot position indication signal, or the vertical address Av, according to the invention, in relation to the vertical position on the screen 3.

The vertical address Av generated in response to the first vertical deflection current Iv1 follows from the two equations:

$$Av(T1)=A0+dA.T1=A1$$

$$Av(T2)=A0+dA.T2=A2$$

Due to the first equation, it is ensured that at moment T1 at which the vertical current Iv has the first predetermined value I1, a vertical address Av is generated equal to a chosen value A1. Due to the second equation, it is ensured that at moment T2 at which the vertical current Iv has the second predetermined value I2, a vertical address Av is generated equal to a chosen value A2.

From these two equations, the initial and incremental values A0, dA can be calculated, the calculated values substituted in the linear function representing the vertical address Av giving:

$$Av(t)=(A1.T2-A2.T1)/(T2-T1)+t.(A2-A1)/(T2-T-1)$$

wherein $Av(T1)=A1$ and $Av(T2)=A2$.

Hence, the vertical address Av(t) depends on a choice of the first and second address values A1,A2.

As the first vertical deflection current Iv1 has a shape to obtain a linear vertical scan, it is sufficient to lock the vertical address Av on two positions P1,P2 to the screen. All other positions on the screen will then be locked to the vertical address Av, as the vertical address Av is a linear function in time. This means that the start value A0=0 corresponds to the vertical position Ps1 and that the end value As corresponds to the vertical position Pe1.

In the following, it is elucidated that the vertical address Av, generated as described above, supplies the same address values at the same vertical positions if the amplitude of the vertical deflection current is changed.

The vertical address Av, generated in response to the second vertical deflection current Iv2, follows from the two equations:

$$Av(T1')=A0+dA.T1'=A1$$

$$Av(T2')=A0+dA.T2'=A2$$

Due to the first equation, it is ensured that at moment T1' at which the vertical current Iv has the first predetermined value I1, a vertical address Av is generated equal to a chosen value A1. Due to the second equation, it is ensured that at moment T2' at which the vertical current Iv has the second predetermined value I2, a vertical address Av is generated equal to a chosen value A2.

From these two equations, the initial and incremental values A0, dA can be calculated, the calculated values substituted in the linear function representing the vertical address Av giving:

$$Av(t)=(A1.T2'-A2.T1')/(T2'-T1')+t.(A2-A1)/(T2'-T1')$$

wherein $Av(T1')=A1$ and $Av(T2')=A2$.

Thus, the vertical address Av has the same first address value A1 at the first vertical position P1 at which the vertical current has the first predetermined value I1. And, the vertical address Av has the same second address value A2 at the first vertical position P2 at which the vertical current has the second predetermined value I2. As also the second vertical deflection current Iv2 has a shape to obtain a linear vertical scan, it is sufficient to lock the vertical address Av on two positions P1,P2 to the screen. All other positions on the screen will then be locked to the vertical address Av as the vertical address Av, is a linear function in time. Hence, the vertical address generator 4 generates a vertical address Av which has the same values at same positions on the screen 3, although the amplitude of the vertical deflection current Iv has been changed.

Figure 12:
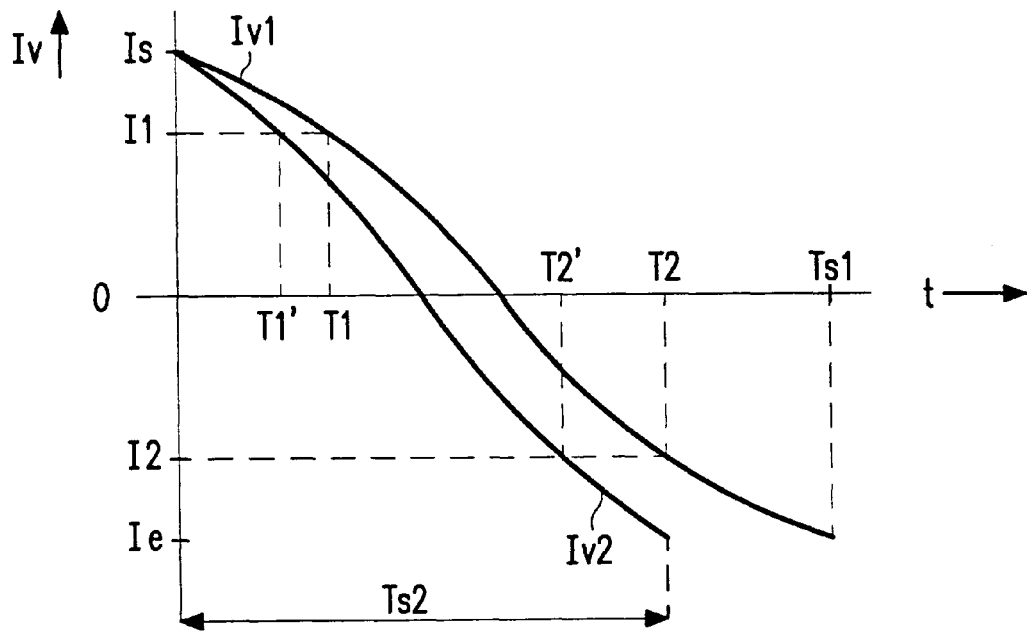
FIG. 12 shows a graph of two waveforms representing two vertical deflection currents which have a scan period with a different duration.

FIG. 12 shows a first and a second vertical deflection current Iv1,Iv2 which have scan periods with different durations Ts1,Ts2, respectively. The first and second deflection current Iv1,Iv2 have the same amplitude. The first deflection currents Iv1 starts at moment 0 with a start current value Is, and ends at the moment Ts1 with an end current value Ie. The second deflection current Iv2 starts at moment 0 with the same start current value Is, and ends at the moment Ts2 with the same end current value Ie. As an example, both vertical deflection currents Iv1,Iv2 are S-corrected sawtooth waveforms which cause an approximate linear vertical scan on the cathode ray tube screen. The first and second vertical deflection currents Iv1,Iv2 reach a first predetermined value I1 at moments T1 and T1', respectively. The first and second vertical deflection currents Iv1,Iv2 reach a second predetermined value I2 at moments T2 and T2', respectively.

Figure 13:
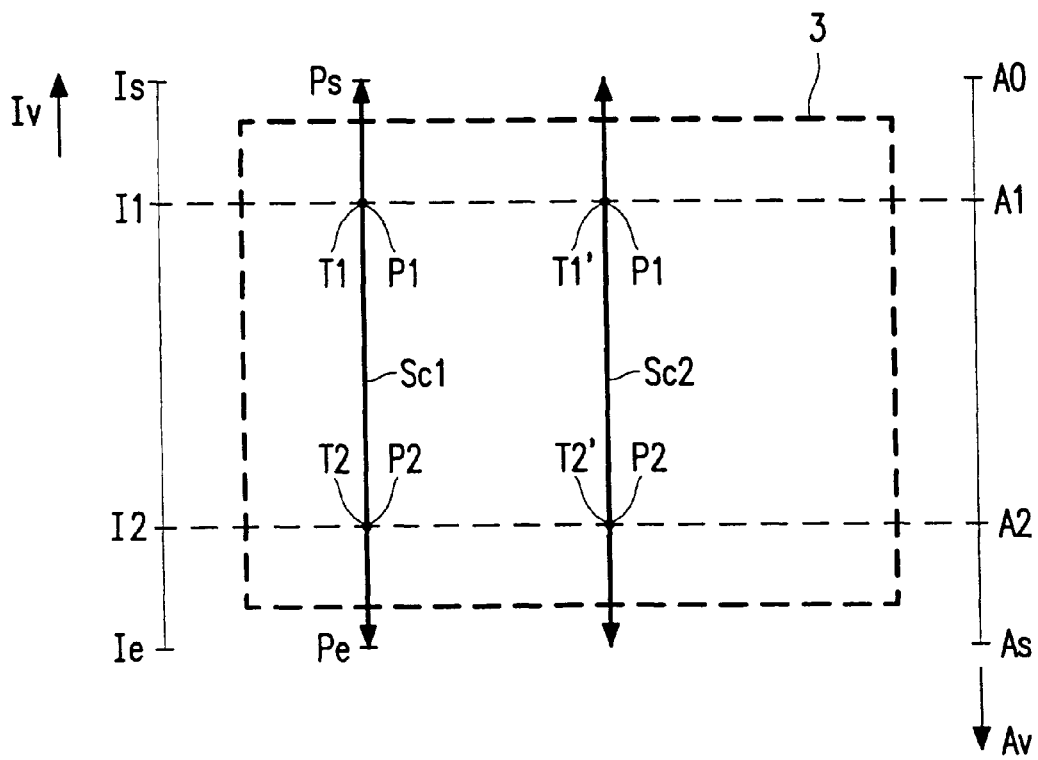
FIG. 13 shows a picture to elucidate the relation between the vertical deflection current, the vertical position on the screen and the position indication signal with respect to the vertical deflection currents shown in FIG. 12.

FIG. 13 shows a picture to elucidate the relation between the vertical deflection current Iv, the vertical position on the screen and the position indication A with respect to the vertical deflection currents Iv1,Iv2 shown in FIG. 12. The dashed line 3 represents a cathode ray tube screen with an aspect ratio of 4:3. The line positioned left of the screen 3 indicates values of the vertical deflection current Iv. At this line are indicated: the start current Is, the end current Ie, and the first and second predetermined vertical deflection current values I1,I2. A certain value of the vertical deflection current Iv corresponds, in a one-to-one relation with a certain vertical position on the screen 3. The first line Sc1 indicates the scanned part of the screen 3 belonging to the first vertical deflection current Iv1. The second line Sc2 indicates the scanned part of the screen 3 belonging to the second vertical deflection current Iv2. The first and second lines Sc1, SC2 both start at the vertical position Ps, corresponding to the start current Is, and both end at the vertical position Pe, corresponding to the end current Ie.

The vertical address Av, generated in response to the first vertical deflection current Iv1, follows from the two equations:

$$Av(T1)=A0+dA.T1=A1$$

$$Av(T2)=A0+dA.T2=A2$$

Again, the first and second predetermined vertical deflection current values I1,I2, occurring, at the moments T1,T2, respectively, are locked to a first and a second predetermined vertical address value A1,A2, respectively. All other vertical address values are locked to a vertical position, as the vertical address Av is a linear function of time and the shape of the first vertical deflection current Iv1 causes a linear vertical scan.

The vertical address Av generated in response to the second vertical deflection current Iv2 follows from the two equations:

$$Av(T1')=A0+dA.T1'=A1$$

$$Av(T2')=A0+dA.T2'=A2$$

Now, the first and second predetermined vertical deflection current values I1,I2, occurring at the moments T1',T2', respectively, are locked to the first and a second predetermined vertical address value A1,A2, respectively. Again, all other vertical address values Av are locked to a vertical position, as the vertical address Av is linear function of time and the shape of the second vertical deflection current Iv1 causes a linear vertical scan.

The invention can be used to interpolate a vertical or a horizontal correction waveform from a few stored values ai. The invention can also be used to correct for convergence or other deflection distortions (for example, north-south pincushion distortion) occurring in so-called transposed scanned picture tubes, whereby vertical scanned lines succeed each other in the horizontal direction.

I claim:

1. A method for generating a one-dimensional spline waveform, the one-dimensional spline waveform being a function of a position on a display screen of a display device in one direction, the method comprising the steps:

generating, from a position information indicating the position on the display screen, a position address, the position address being partitioned in a section number indicating a number of a section, and a relative position indicating a position within the section for virtually partitioning the display screen in sections in the one direction;

calculating, in each section, from the relative position and a set of p+1 sub-function coefficients, a sub-function being a polynomial of degree p>1 for obtaining the one-dimensional spline waveform being a chain of n–p consecutive sub-functions in n–p corresponding consecutive sections, an analog representation of the one-dimensional spline waveform being continuous and at least p–1 times continuous differentiable;

selecting, in response to the section number, from an array of n consecutive predetermined values, a selected subset of $q \geq p+1$ consecutive selected values, the selected subset for the section (Si) being a(I+r), a(I+r+1), . . . , a(I+r+q–1) with r being selected from a range p+1–$q \leq r \leq 0$, whereby a(I)=0 for i<1 and i>n; and multiplying, in each section, the selected subset with a fixed (p+1)*q spline matrix of multiplication factors to produce the set of p+1 subfunction coefficients (bi1, . . . , b(p+1)I).

2. A method as claimed in claim 1, characterized in that in every row of the spline matrix, at least one of the multiplication factors is not zero for obtaining sub-functions comprising all powers of the relative position (d) from zero up to and including the p-th power.

3. A method as claimed in claim 1, characterized in that q=p+1 for obtaining a (p+1)*(p+1) spline matrix and selecting a number of selected values being equal to a number of sub-function coefficients.

4. A method as claimed in claim 1, characterized in that p=2 for obtaining the waveform being a quadratic spline function.

5. A method as claimed in claim 1, characterized in that the step of generating the position address from the position information which is related to a deflection current, comprises the steps:

measuring a first moment in time at which the position information has a first value;

measuring a second moment in time at which the position information has a second value; and calculating the position address as a linear function in time from predetermined position address values at the first and second moments in time, whereby the deflection current has a shape for obtaining an approximately linear scan on the screen.

6. A method as claimed in claim 5, characterized in that the steps of measuring the first and second moments in time comprise the steps:

generating a count value indicative of a period of time;

storing a first count value in response to detecting that the position information has the first value, said first count value being related to the first moment in time; and storing a second count value in response to detecting that the position information has the second value, said second count value being related to the second moment in time;

wherein said step of calculating the position address as a linear function in time from predetermined position address values at the first and second moments in time is performed using the first and second count values.

7. A method for generating a two-dimensional spline waveform, the two-dimensional spline waveform being dependent on a position in a first and a second direction on a screen of a display device, the display device being scanned in a raster of lines, the first and the second direction being substantially perpendicular, the method comprises the steps:

generating m one-dimensional spline waveforms from m sets of predetermined values, the one-dimensional spline waveforms being generated according to the method as claimed in claim 1, wherein the position address is a position address related to the position on the screen in the first direction, each of the one-dimensional waveforms representing output values being the values of the one-dimensional waveforms at the positions of the lines in the raster; and generating, from the output values and a position address related to the position on the screen in the second direction, the two-dimensional spline waveform.

8. A method as claimed in claim 7, characterized in that the step of generating the two-dimensional spline waveform is performed according to the method of claim 1, wherein the position address is related to the position on the screen in the second direction and the predetermined values are the output values.

9. A system for generating a one-dimensional spline waveform, the one-dimensional spline waveform being a function of a position on a display screen of a display device in one direction, the system comprising:

means for generating, from a position information indicating the position on the display screen, a position address, the position address being partitioned in a section number indicating a number of a section and a relative position indicating a position within the section for virtually partitioning the display screen in sections in the one direction;

calculating means for calculating, in each section, from the relative position and a set of p+1 sub-function coefficients, a sub-function being a polynomial of degree p>1 for obtaining the one-dimensional spline waveform being a chain of n–p consecutive sub-functions in n–p corresponding consecutive sections, an analog representation of the one-dimensional spline waveform being continuous and at least p–1 times continuous differentiable;

means for selecting, in response to the section number, from an array of n consecutive predetermined values, a selected subset of q≧p+1 consecutive selected values, the selected subset for the section (Si) being a(I+r), a(I+r+1), ..., a(I+r+q–1) with r being selected from a range p+1–q≦r≦0, whereby a(I)=0 for i<1 and i>n; and means for multiplying, in each section, the selected subset with a fixed (p+1)*q spline matrix of multiplication factors to produce the set of p+1 subfunction coefficients.

10. A display apparatus comprising:

a display device with a display screen for displaying display information;

an addressing circuit receiving a horizontal and vertical position signal for supplying position determining signals;

means, coupled to said addressing means, for determining the position on the display screen;

means for generating a one-dimensional digital waveform being represented by discrete values, the one-dimensional digital waveform being a function of a position on the display screen in one direction, the means for generating the one-dimensional digital waveform comprising:

means for generating, from a position information indicating the position on the display screen, a position address, the position address being partitioned in a section number indicating a number of a section and a relative position indicating a position within the section for virtually partitioning the display screen in sections in the one direction;

calculating means for calculating, in each section, from the relative position and a set of p+1 sub-function coefficients, a sub-function being a polynomial of degree p>1 for obtaining the one-dimensional digital waveform being a chain of n–p consecutive sub-functions in n–p corresponding consecutive sections;

means for selecting, in response to the section number, from an array of n consecutive predetermined values, a selected subset of q≧p+1 consecutive selected values, the selected subset for the section being a(I+r), a(I+r+1), ..., a(I+r+q–1) with r being selected from a range p+1–q≦r≦0, whereby a(I)=0 for i<1 and i>n;

means for multiplying, in each section, the selected subset with a fixed (p+1)*q spline matrix of multiplication factors to produce the set of p+1 subfunction coefficients;

means for converting the one-dimensional digital waveform into an analog one-dimensional spline waveform, the analog one-dimensional spline waveform being continuous and at least p–1 times continuous differentiable; and means, coupled to receive the analog one-dimensional spline waveform, for influencing the position on the display screen.

11. A method for generating a ki-th order one-dimensional spline waveform, the one-dimensional spline waveform being a function of a position on a display screen of a display device in one direction, the method comprising the steps:

generating, from a position information indicating the position in the one direction, a position address; and generating, at positions indicated by the position address, a correction waveform from n predetermined input values, the correction waveform being a p-th order spline function composed of n–p consecutive sub-functions in n–p respectively corresponding consecutive sections, wherein p is larger than 1, characterized in that the correction waveform generating step comprises the steps:

generating n basic functions of the position address, the basic functions all having a same shape and being shifted over one section with respect to each other, and each being a ki-th order spline function, the basic functions being composed as a chain of portions each extending over one section;

multiplying each of the basic functions with an associated one of the stored values;

calculating each of the sub-functions by adding, in a same section, the portions of the basic functions in this section multiplied with the associated stored values.

* * * * *